Figure 5:
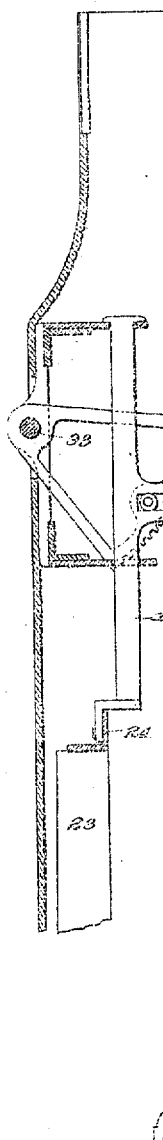

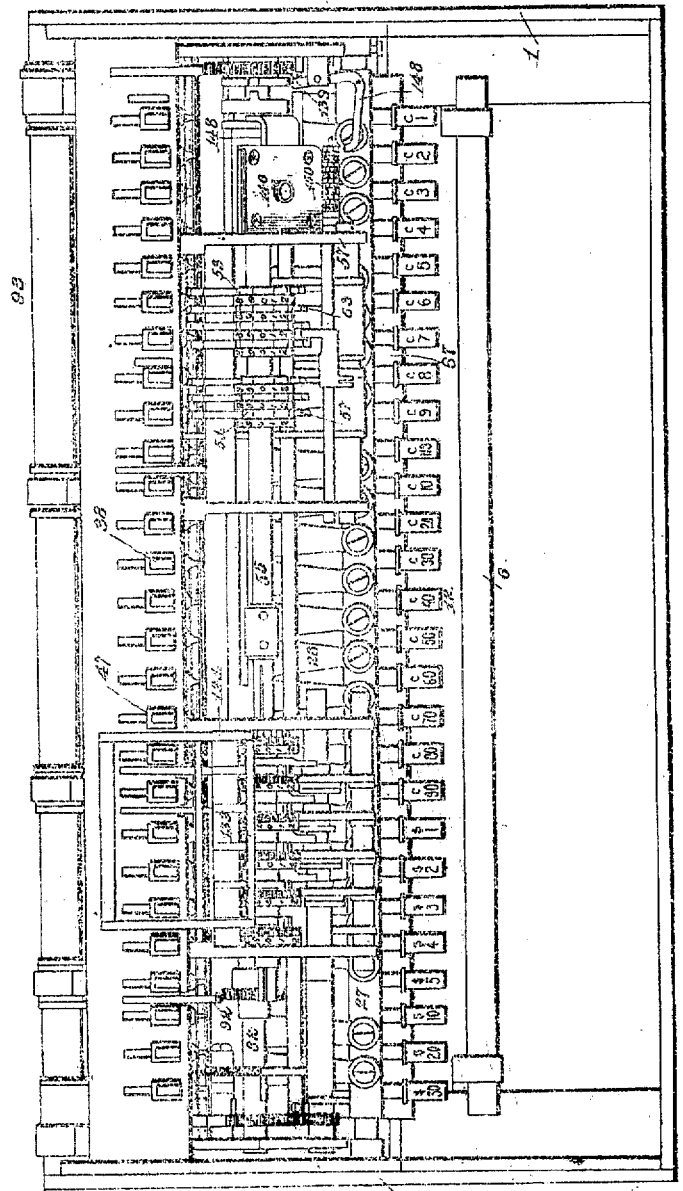

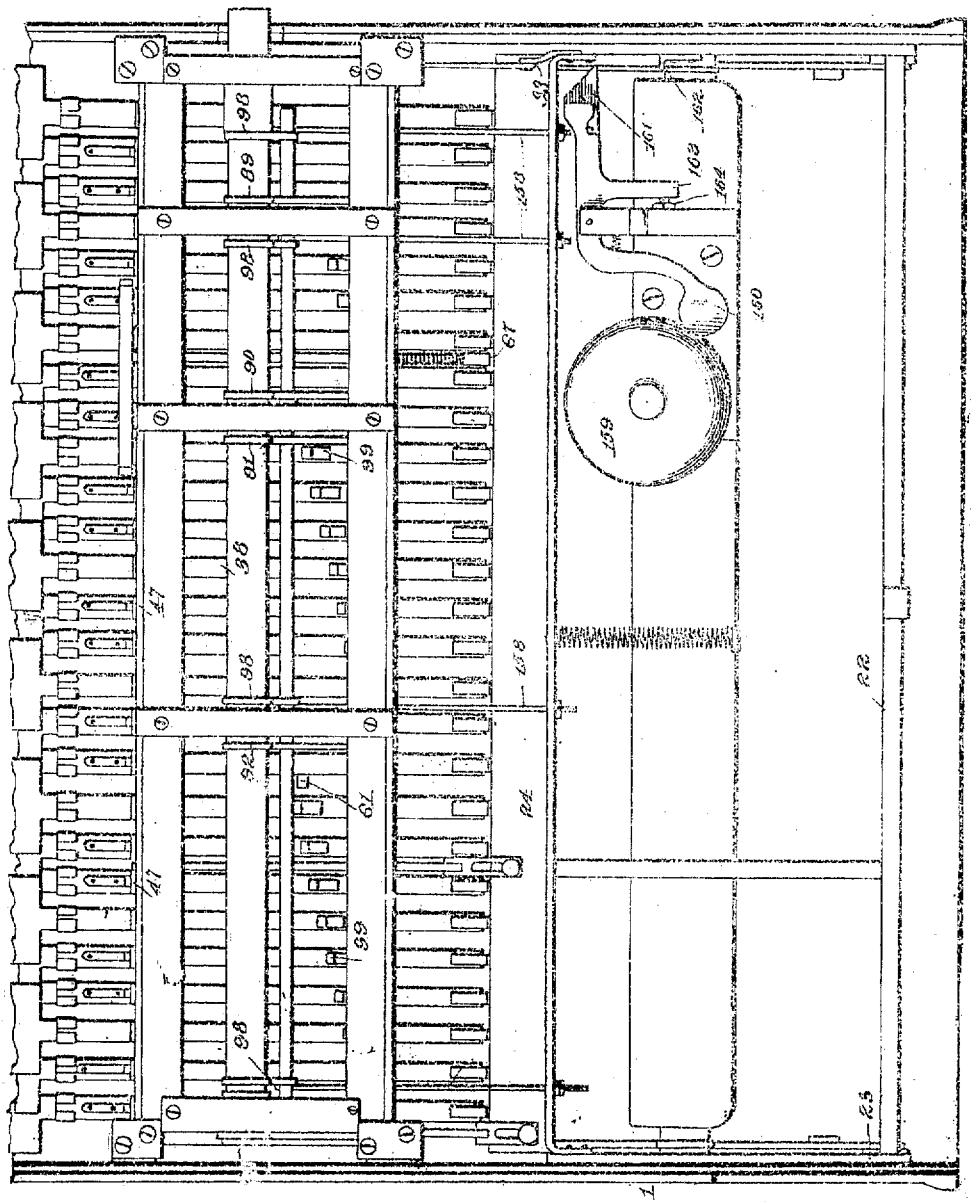

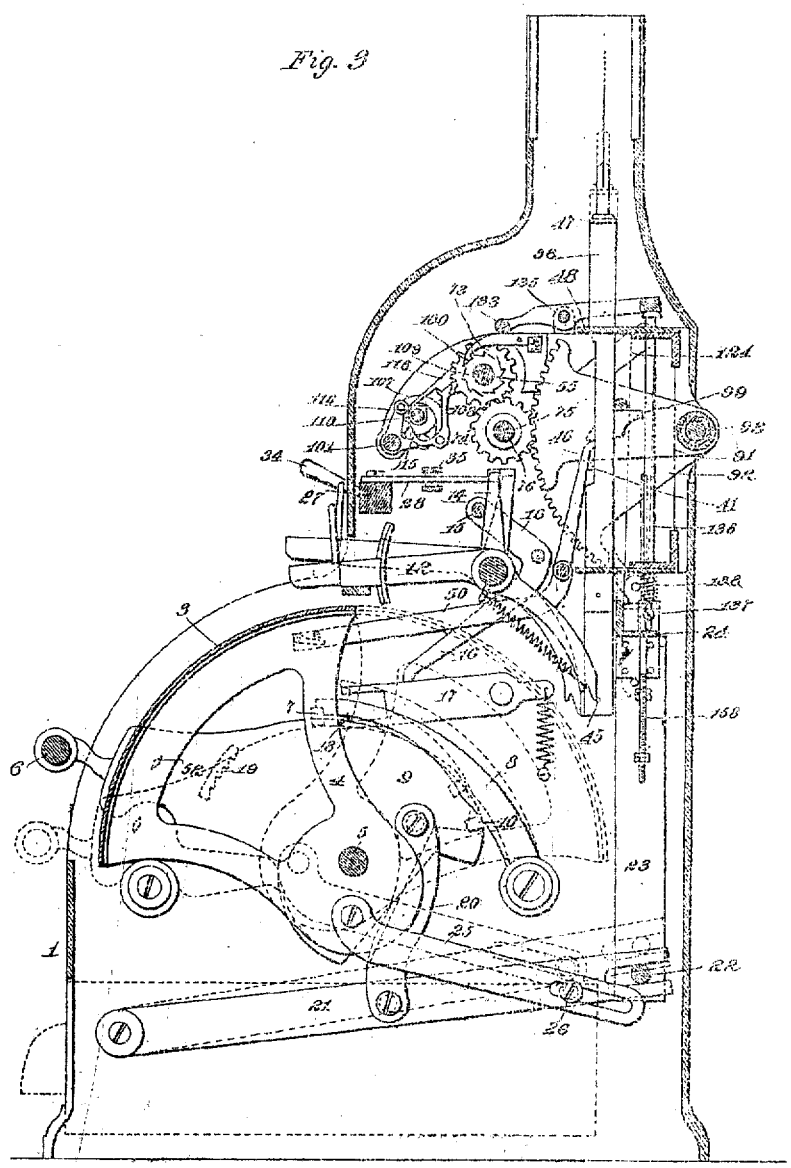

F. C. OSBORN.
CASH REGISTER.
APPLICATION FILED MAR. 6, 1898.

1,015,456.

Patented Jan. 23, 1912.
17 SHEETS—SHEET 4.

Witnesses:

Inventor
Francis C. Osborn
By Dyer Edmonds & Dyer
Atty.

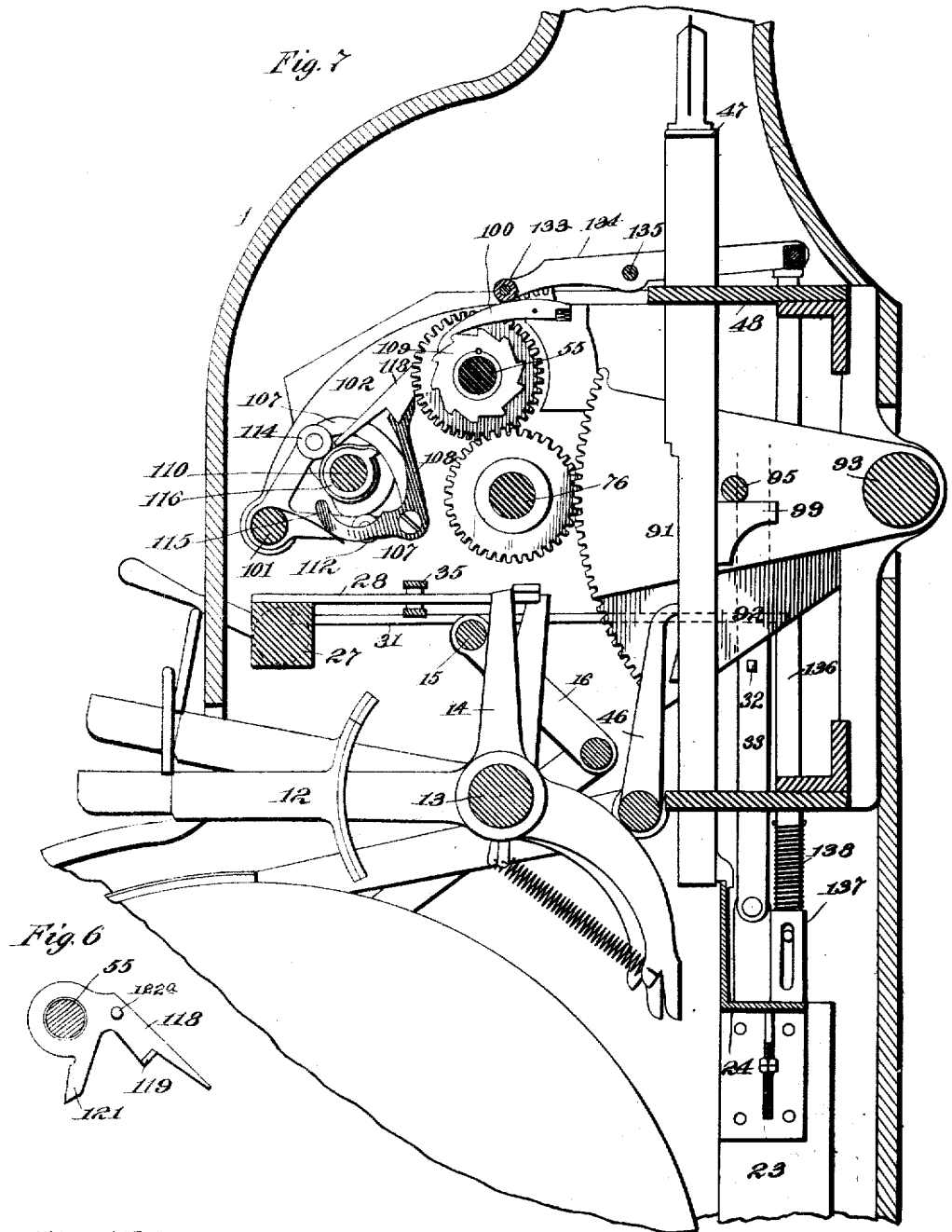

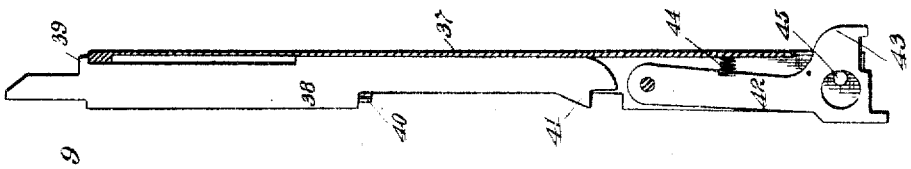
F. C. OSBORN.
CASH REGISTER.
APPLICATION FILED MAR. 6, 1899.
1,015,456.
Patented Jan. 23, 1912.
17 SHEETS—SHEET 6.
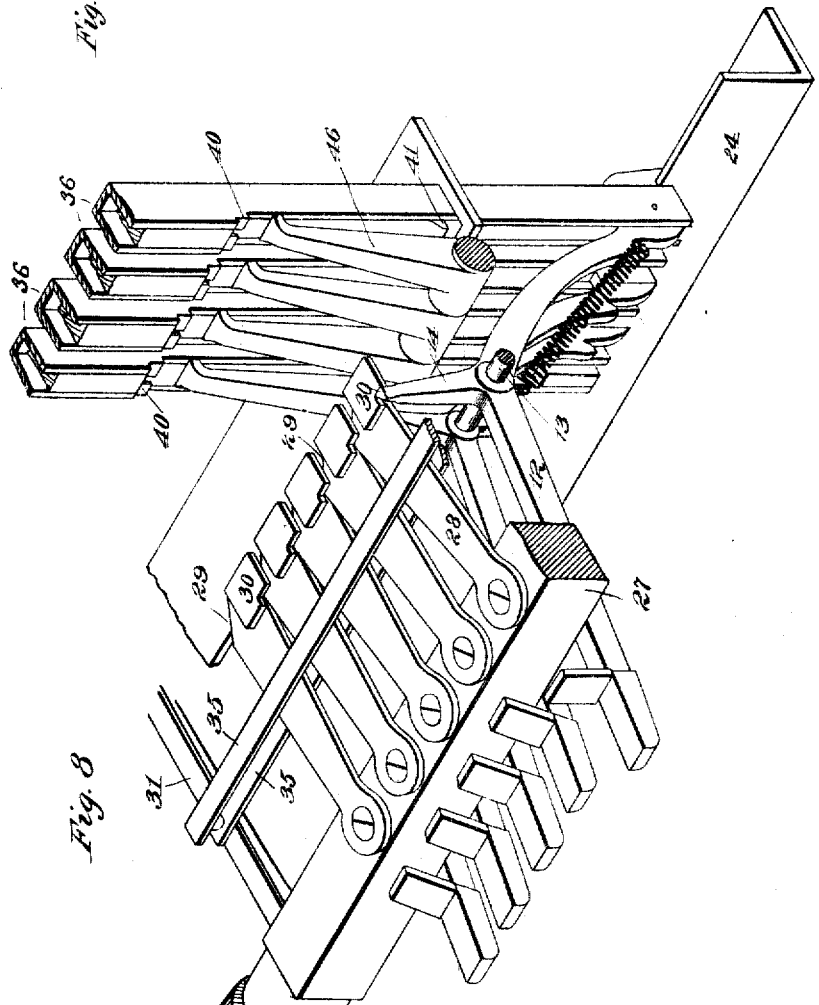

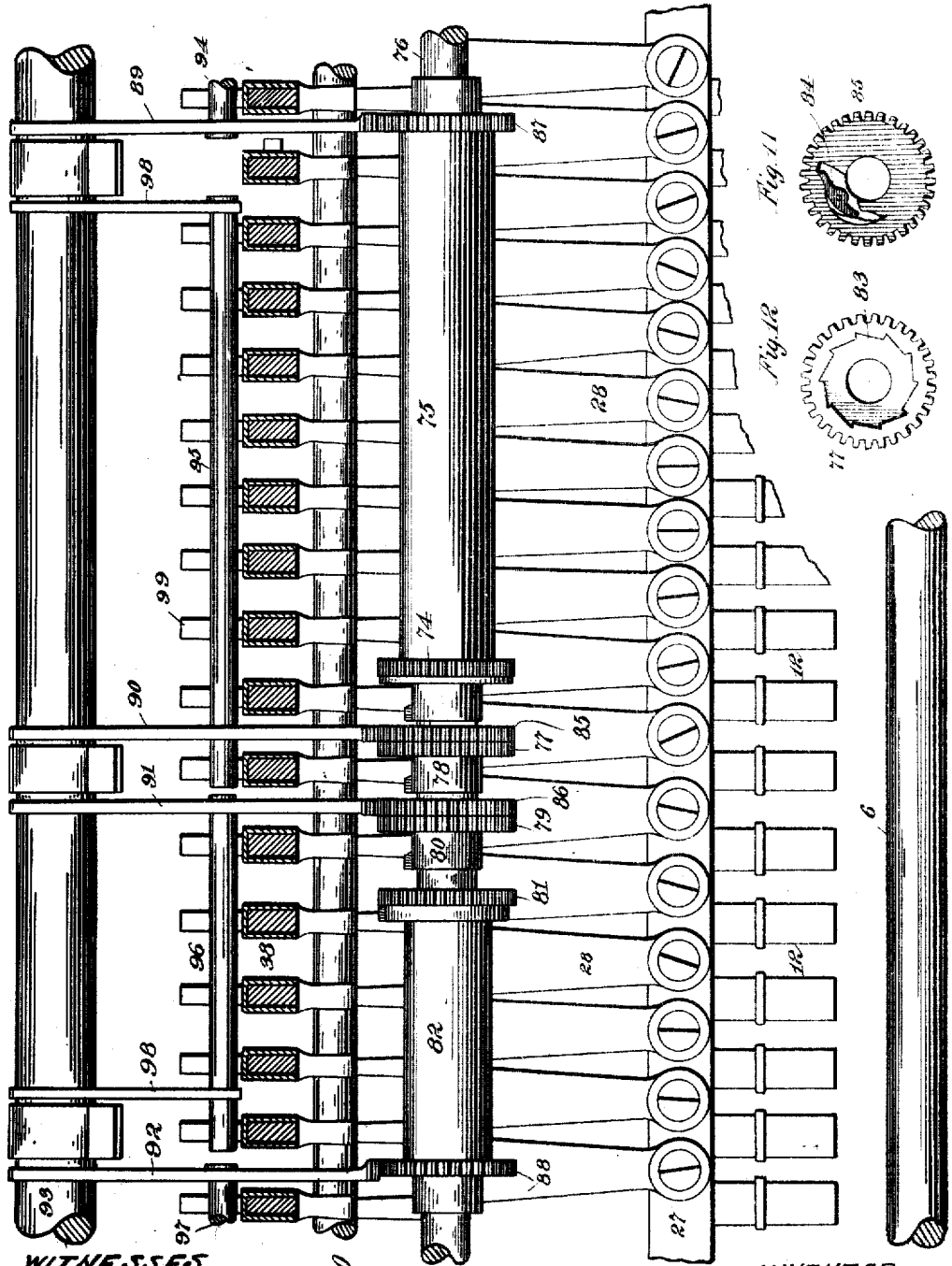

F. C. OSBORN.
CASH REGISTER.
APPLICATION FILED MAR. 6, 1899.
1,015,456.
Patented Jan. 23, 1912.
17 SHEETS—SHEET 8.
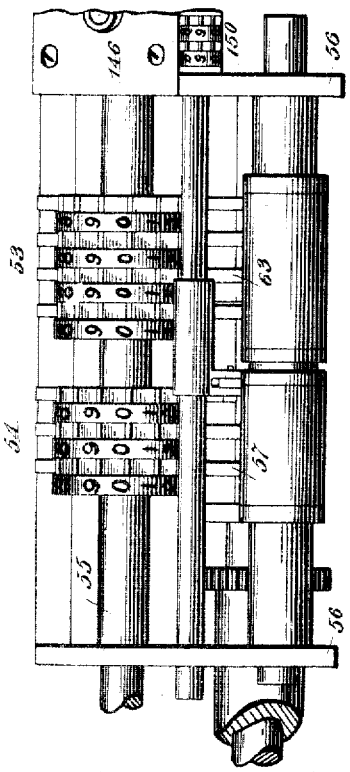
WITNESSES
INVENTOR
Francis C. Osborn
ATT'Y.

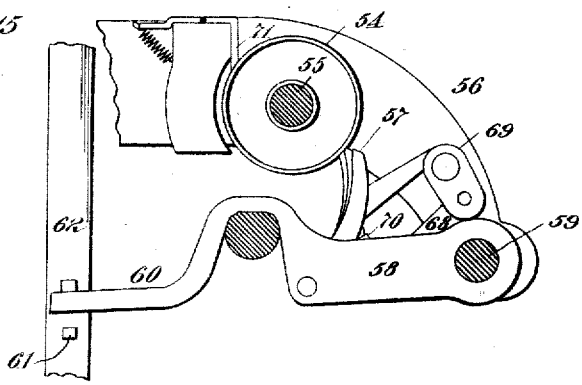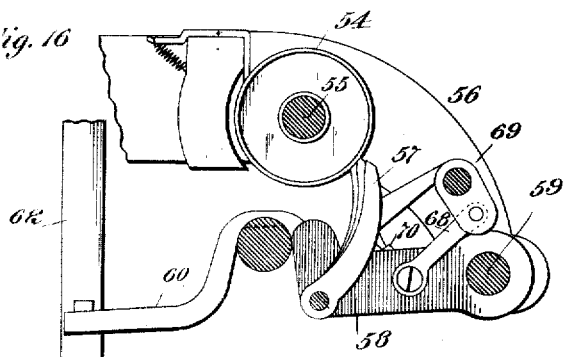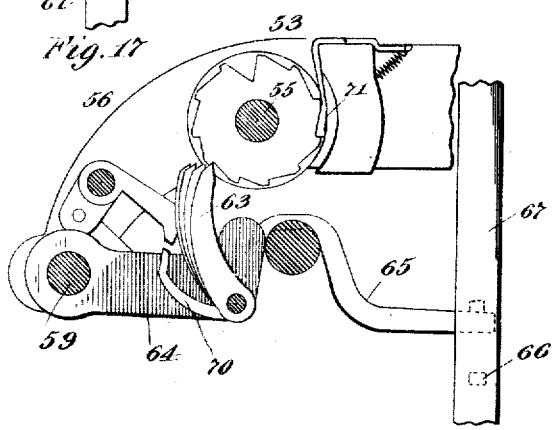

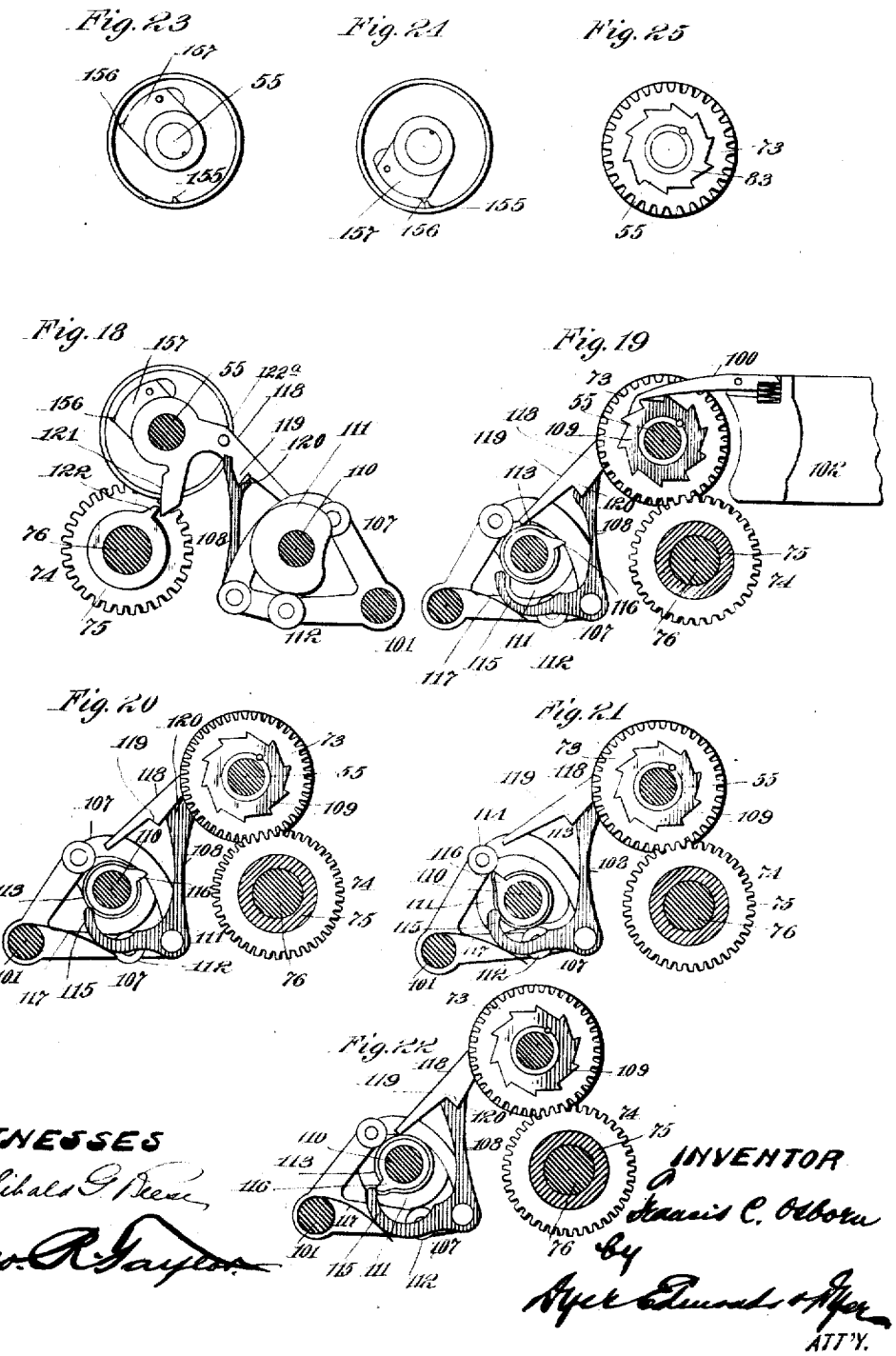

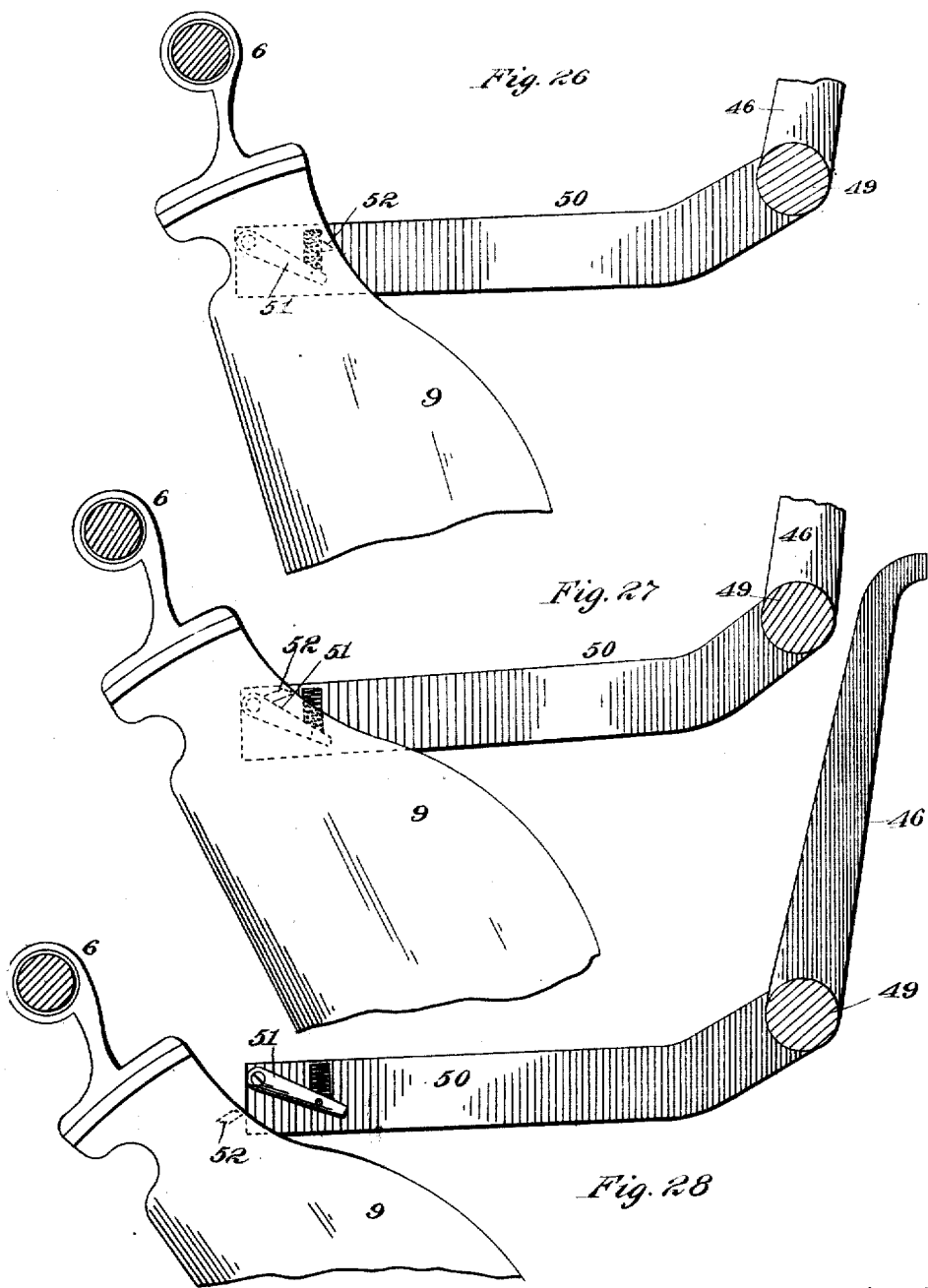

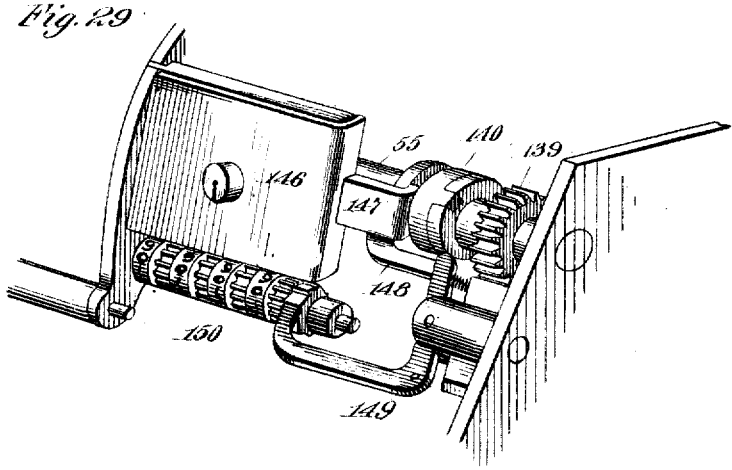
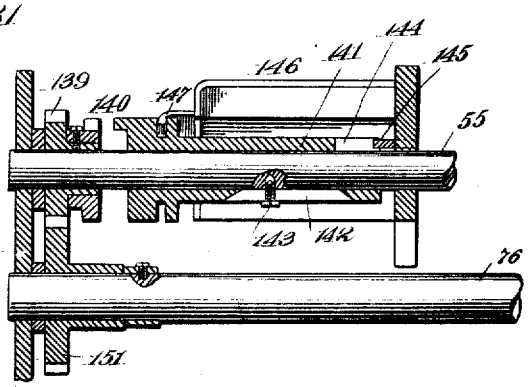
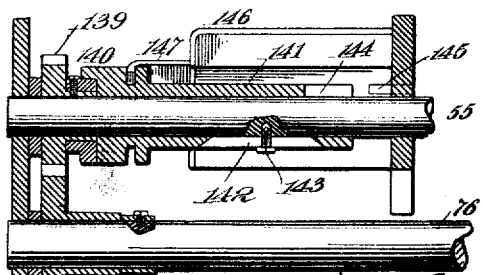

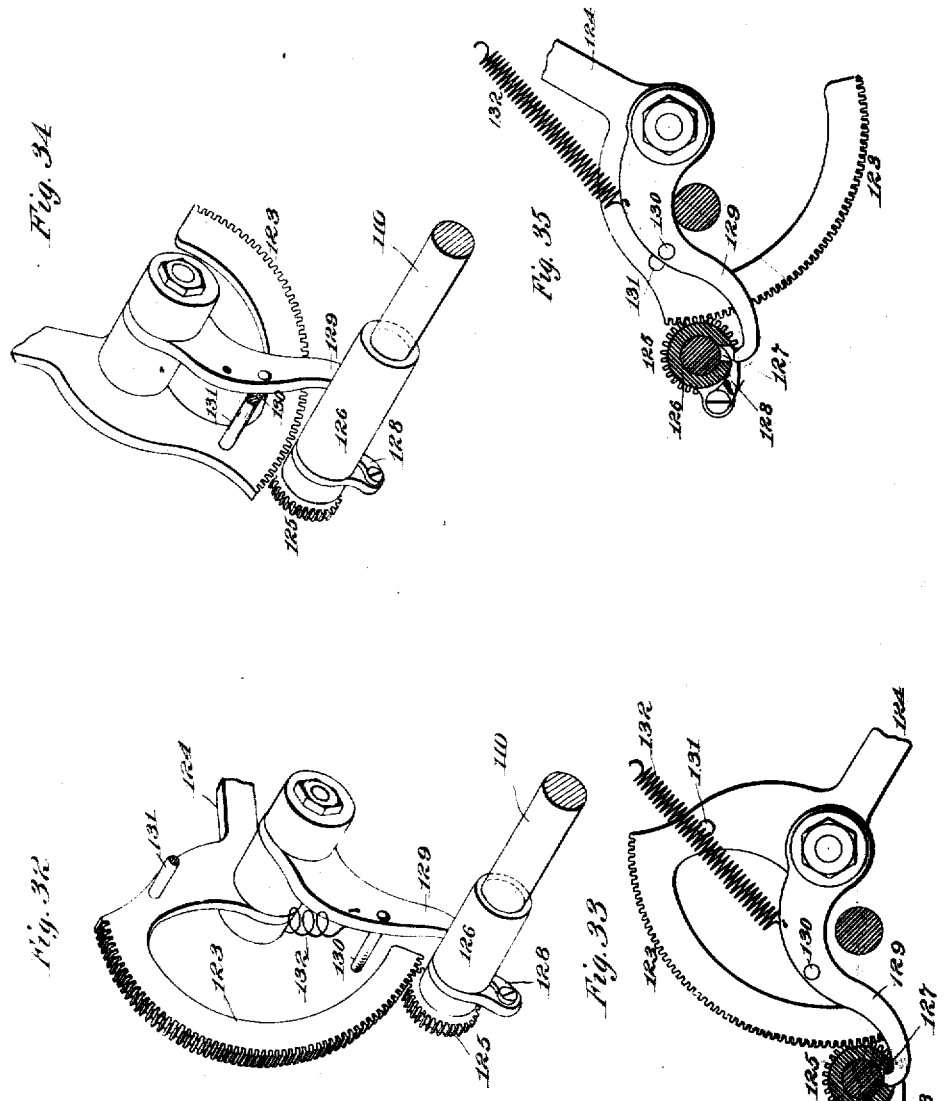

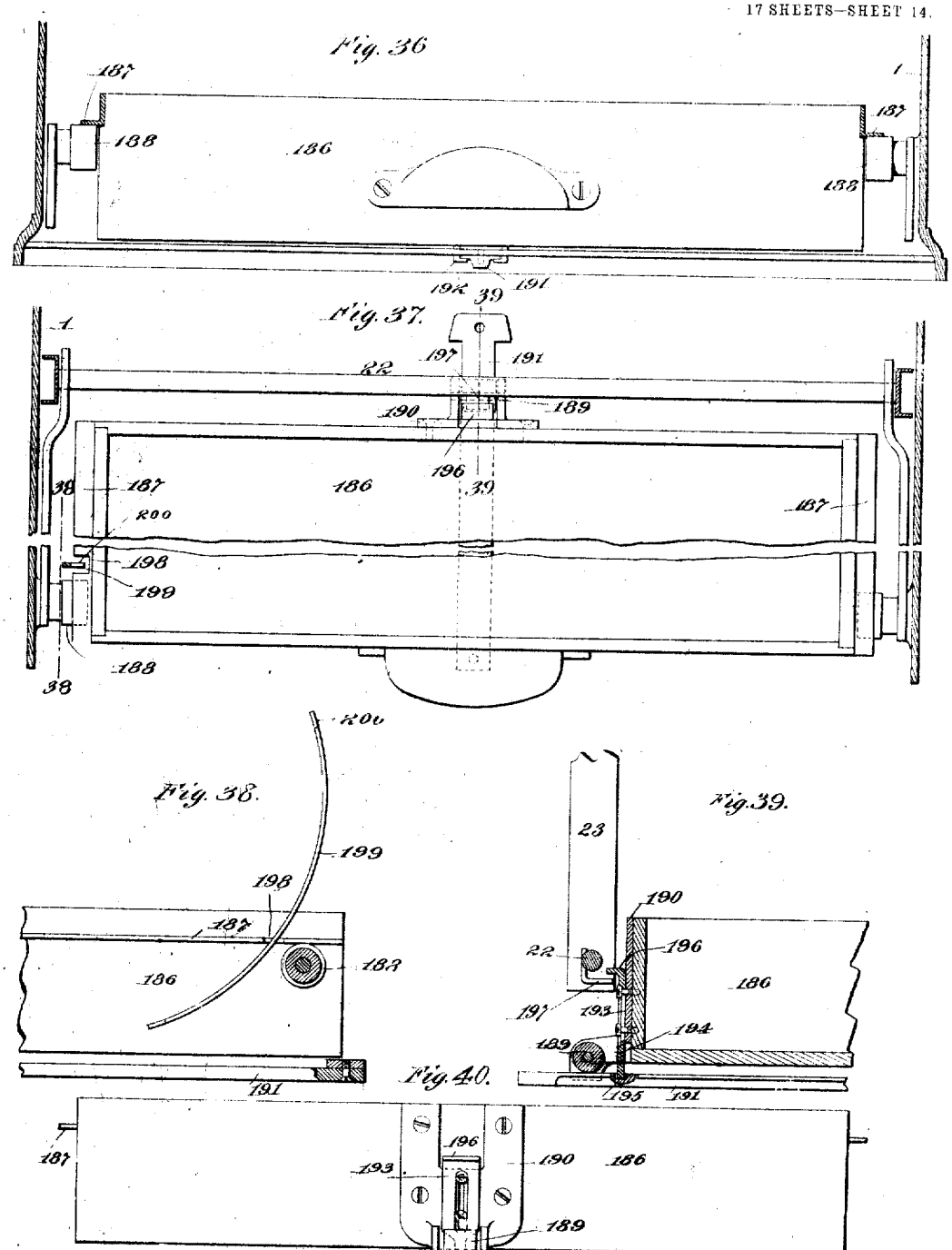

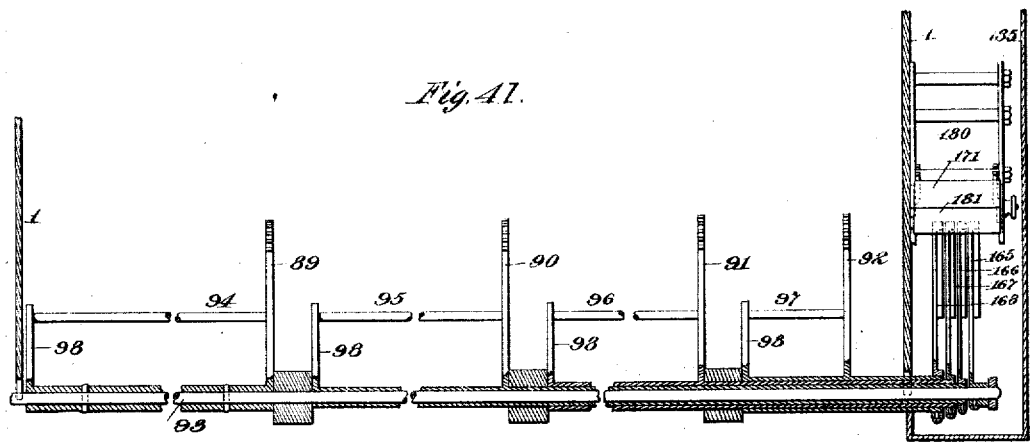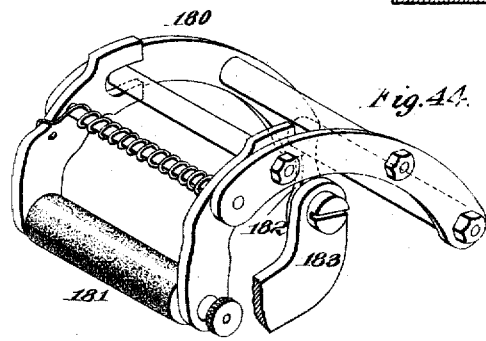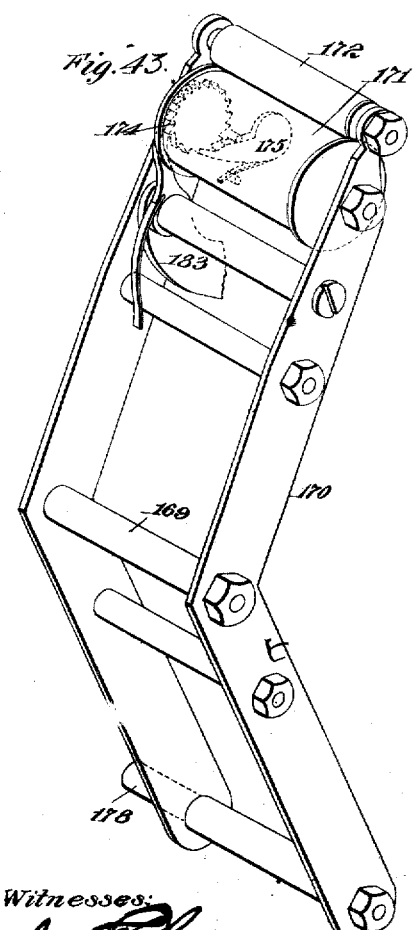

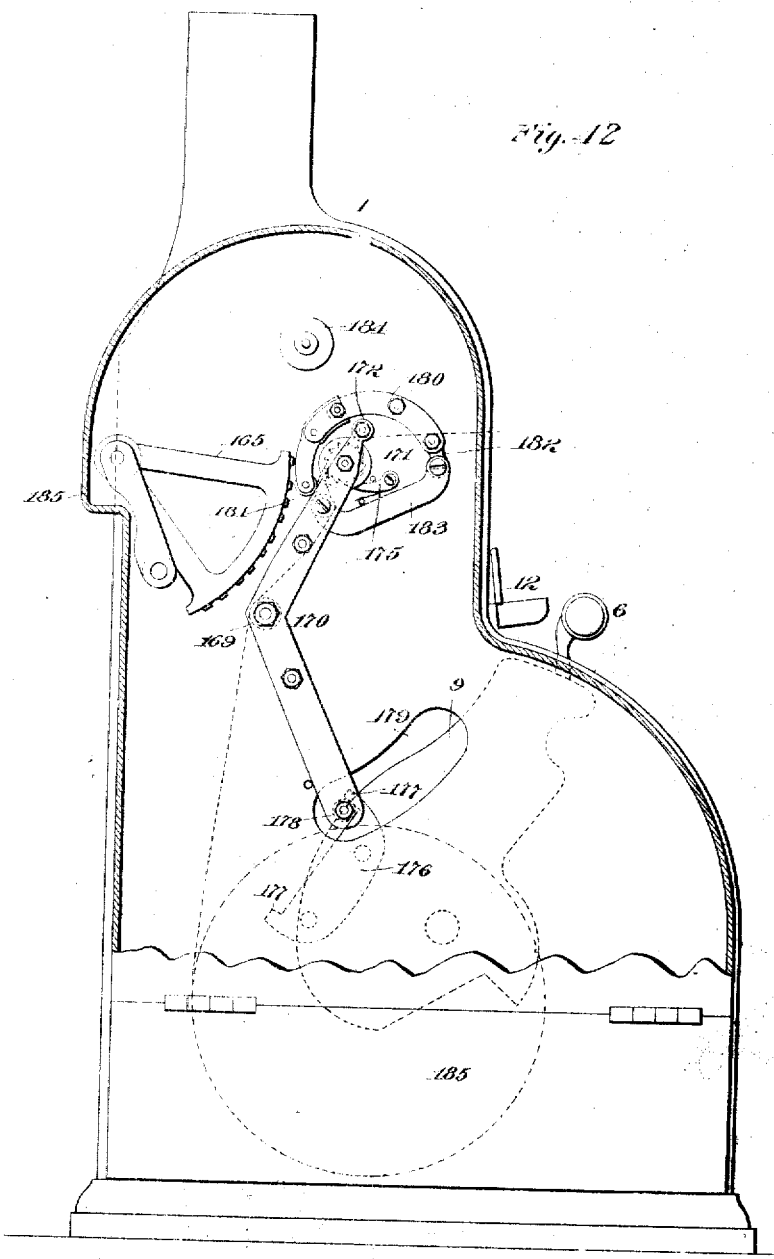

F. C. OSBORN.
CASH REGISTER.
APPLICATION FILED MAR. 6, 1899.

1,015,456.

Patented Jan. 23, 1912.
17 SHEETS—SHEET 17.

Witnesses:

Inventor
Francis C. Osborn

UNITED STATES PATENT OFFICE.

FRANCIS C. OSBORN, OF DETROIT, MICHIGAN, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,015,456.

Specification of Letters Patent.   Patented Jan. 23, 1912.

Application filed March 6, 1899. Serial No. 707,872.

*To all whom it may concern:*

Be it known that I, FRANCIS C. OSBORN, a citizen of the United States, residing at Detroit, in the county of Wayne and State of Michigan, have invented certain new and useful Improvements in Cash-Registers, of which the following is a specification.

My invention relates to various new and useful improvements in cash registers.

My improvements are particularly designed for use in connection with cash registers of the general type invented by me and described and claimed in divers Letters Patent of the United States. Such improvements may, however, be employed in connection with cash registers of other types, and some of the features of invention are not limited to use in connection with cash registers, but may be effectively used in connection with analogous mechanical computating or registering machines. The several novel features constituting my present invention are also preferably utilized in the same machine and go toward the improvement thereof, but it will be understood that such features of novelty may be used in other machines, and that any one or more of such features may be embodied in the same structure.

One of the objects of this invention is to provide with the total adding mechanism and special counters, improved mechanism whereby all of the registering mechanism may be reset to zero by the same movement.

A further object of the invention is to provide improved resetting mechanism which may be operated by the ordinary operation of the machine.

A further object of the invention is the provision of means in the apparatus whereby when two special counters are employed, one for effecting the registration of the number of sales made and the other for effecting the registration of the number of times the no sale key is depressed, the counter for effecting the last registration will be operated without effecting a corresponding operation of the sale or customer counter.

A further object of the invention is to provide improved means for locking a key or keys in depressed position and with which it will be possible to unlock a key without effecting any registration in case the key is erroneously depressed.

A further object of the invention is to provide an improved money drawer which may be used in connection with the stationary till as a receptacle for bills, or which may be used in substitution of the stationary till. The said money drawer being so constructed as to be released upon the exposure of the tablet or tablets so as to then be opened by hand or automatically by a spring. When the improved money drawer is used in connection with the stationary till it coöperates with the cover or cover actuating mechanism of the latter so as to prevent the cover from being closed until the drawer is closed and preventing the opening of the drawer before the complete opening movement of the stationary till.

Figure 4:
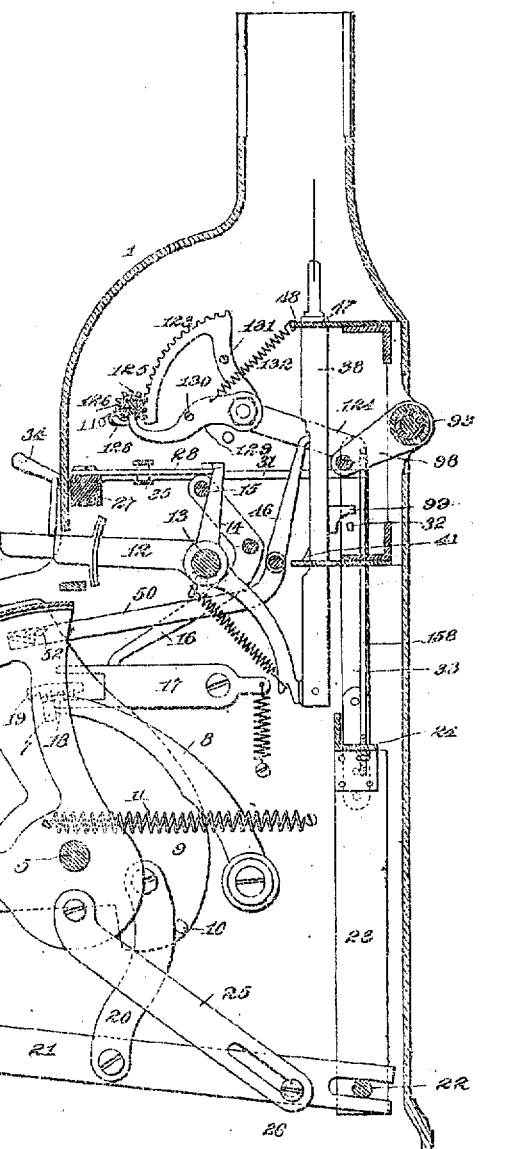
Figure 45:
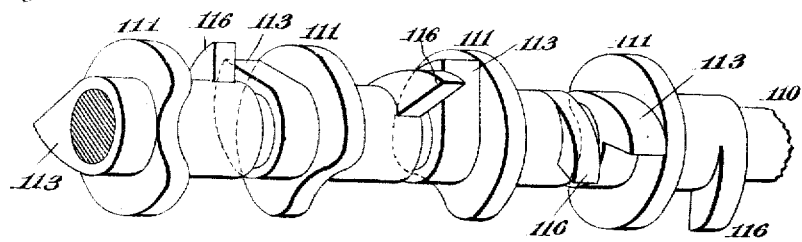
Figure 46:
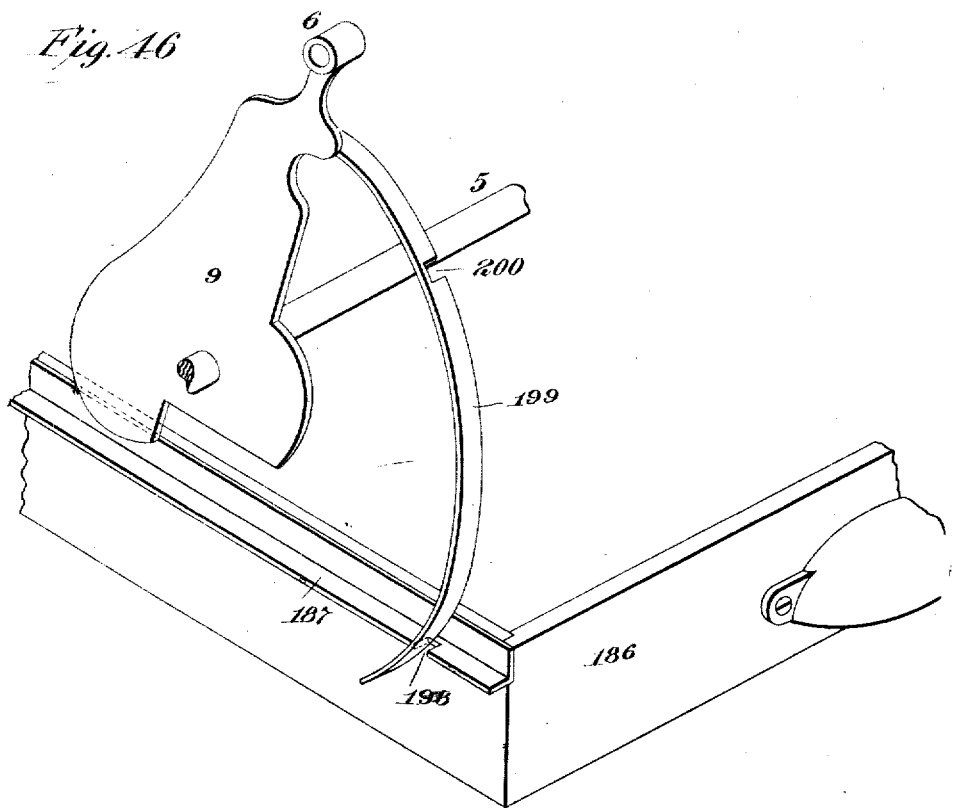

In the drawings, Figure 1 is a plan view of the machine; Fig. 2 a rear elevation with the case removed; Fig. 3 a section through the total adding mechanism with the till-cover closed and the operating bar partly lowered; Fig. 4 a section near one end of the machine showing the mechanism for operating the cam shaft; Fig. 5 a detail section showing the mechanism for operating the resetting mechanism; Fig. 6 a detail view of the finger 118; Fig. 7 an enlarged section showing the key stops and key lock with the tablet in elevated position; Fig. 8 a perspective view of the key stops and key locks with the tablet-rods; Fig. 9 a section of the tablet-rod; Fig. 10 a horizontal section taken below the total adding mechanism illustrating the preferred arrangement of operating mechanism for use in a four-section total adder; Figs. 11 and 12 detail views illustrating the connection between the sleeves and the intermediate gears; Fig. 13 a separate plan of the total adder; Fig. 14 a similar view of the no-sale and customer counters illustrating a portion of the lock with the resetting clutch and the resetting counter; Fig. 15 an end view showing the no-sale and customer counters and connections; Fig. 16 a section through the no-sale counter illustrating the mechanism for throwing out the customer counter when the no-sale counter is operated; Fig. 17 a section through the customer counter looking in the opposite direction and showing the same parts; Figs. 18 to 22 inclusive are detail views illustrating the consecutive pawl mechanism of the total adder showing five separate positions of the parts; Figs. 23 and 24 detail views illustrating the resetting pawl for each disk; Fig. 25 is an obverse view of the registering wheel shown in Fig. 24; Figs. 26, 27 and 28 detail views illustrating the mechanism for dropping the tablet by the preliminary movement of the till-cover or its operating-bar; Fig. 29 a perspective view of the resetting clutch and its coöperating parts; Fig. 30 is a section of the same mechanism with the clutch in engagement; Fig. 31 a similar view with the clutch out of engagement; Fig. 32 a perspective view illustrating the cam shaft, the cam shaft operating segment, and its locking pawl for preventing overthrow of the cam shaft; Fig. 33 a section through the same elements showing the locking pawl in engagement with the cam shaft; Figs. 34 and 35 a perspective view and a section respectively through the same elements illustrating the locking pawl out of engagement with the cam shaft; Fig. 36 a front view of the lower portion of the cash register, illustrating the preferred construction of money drawer therefor, the front of the register being removed; Fig. 37 a top view of the money drawer illustrating the coöperating rims; Fig. 38 a section on the line 38—38 of Fig. 37; Fig. 39 a section on the line 39—39 of Fig. 37; Fig. 40 a rear elevation of the cash drawer; Fig. 41 a section through the sleeves of the several tilting frames and printing wheels; Figs. 42 to 44 detail views of the printing mechanism; Fig. 45 a perspective view of the cam shaft for operating the several pawl carrying frames of the total adding register; and Fig. 46 a perspective view illustrating the coöperating rims on the money drawer and the adjacent segment.

In all of the above views, corresponding parts are represented by the same numerals of reference.

The operative parts of the register are carried in a suitable casing 1. Mounted in this casing is a till 2, shown in dotted lines Fig. 3. The till is provided with a cover 3 for closing and disclosing it, which cover in this instance is carried on side plates 4 pivoted at 5 at the sides of the casing. 6 is a bar which operates or controls the movement of the cover. This bar may be connected directly to the cover 3 so as to open the cover when the bar is moved downward, but in the present instance the said bar releases a trip for the cover when the bar has almost completed its full positive stroke. To effect this end, one or both of the side plates 4 is provided with a stud 7 thereon, with which a locking-arm 8 engages. The operating-bar 6 is mounted on the segments 9, which are carried on the pivots 5. One of the plates 9 is provided with a lug or finger 10, which is adapted to engage the lock 8 so as to withdraw it from the stud 7, as shown in Fig. 3. When the till-cover has been thus released, it is preferably opened by a spring 11 connected to it. The advantage of the construction thus described is that it prevents the disclosure of the money receptacle until the operating parts which are controlled by the movement of the bar 6 have almost completed their full positive movements.

Mounted in front of the apparatus are the keys 12, all being pivoted on the bar 13. Each key is provided with an arm 14 mounted in the rear of a bar 15 connected to the bell-crank 16. The lower arm of the bell-crank 16 is adapted to engage a lock 17 for the operating-bar 6, the said latch 17 being provided with a notched finger 18 which engages the serrated plate 19 on one of the segments 9 to which the bar 6 is connected. It will be observed that when one of the keys 12 is depressed, the arm 14 thereof will rock the bell-crank 16, withdrawing the tooth 18 of the latch on the plate 19 and thus unlocking the bar 6, which can then be moved downward.

In order that the cover, when it has been opened, may be returned, I prefer to employ the special connecting mechanism illustrated in Figs. 3, 4, and 5. The segments 9 are connected by links 20 to the side levers 21. These levers 21 are bifurcated at their rear ends, and engage over the bar 22 connecting the slides 23 to which the tablet-elevating bar 24 is secured. The segments 4 of the cover 3 connect at each side by a link 25 with a pin 26 on the side levers 21. The said link 25 is slotted as shown, so as to allow the pin 26 to work therein. When the cover is locked in its normal position, as shown in Fig. 4, the side levers 21 are depressed, and the pin 26 occupies its full rearward position in the slotted link 25. As the bar 6 is moved downward, as shown in Fig. 3, the side levers 21 are moved upward to elevate the tablet-elevating bar, and the pin 26 is advanced in the slotted link, as shown in Fig. 3, it being obvious that when the tablet-elevating bar has reached its maximum elevation, the pin 26 will have reached the forward end of the slot in the link 25. As soon as the lug 10 disengages the latch 8 to release the till-cover and the latter is opened by the spring 11, the link 25 is advanced, its slot moving over the pin 26 to the position shown in dotted lines Fig. 3, in which position the pin 26 will rest in the extreme rear end of said slot. When therefore the operating-bar 6 is elevated, the links 20 will force the side levers 21 downward, and the pin 26 and link 25 will close the till-cover positively, returning the parts to the position shown in Fig. 4.

It is preferable in cash registers of the type I am now describing, to arrange the keys in several banks, and with a machine of the capacity illustrated, it is possible to arrange these keys in four banks representing units, tens, hundreds and thousands. When so arranged, it is desirable to provide means for locking any depressed key in its depressed position, and also to prevent the depression of more than one key in the same bank, which would necessarily result in false registration and confusion. The mechanism I have invented for effecting this locking of the keys is advantageous, and is obviously not limited for use in connection with cash registers of any special type.

27 represents a bar, which is mounted directly above the keys in the side frames and which is preferably rectangular in cross-section. Pivoted to this bar are a series of key-stops 28, each being provided with a wedge-shaped rear end 29. (See Fig. 8.) Each stop carries at its wedged rear end an integral head 30 which laps over upon the adjacent stop. The upper ends of the arms 14 of the key-levers are wedge-shaped, as shown in Fig. 8, and the stops 28 of each bank are so arranged as to provide only for sufficient room to allow the arm 14 of only one key to enter between any two stops. This prevents the depression of two keys simultaneously in a single bank. The parts are so proportioned that when a key is depressed, it enters between the wedge-shaped rear ends of two of the detents, elevating the latch-head 30 so as to pass beneath it, and allowing the latch-head to then lock the key in its depressed position. When the positive stroke of the machine has been almost completed, the depressed key or keys require to be released, and this is effected by means controlled by the movement of the operating-bar 6. The bar 27 is preferably provided with an arm 31 (see Figs. 7 and 8) adapted to be engaged by a lug 32 carried on a link 33 operated by the tablet-elevating bar 24 Figs. 4 and 7, so that as said tablet-elevating bar nears the completion of its upward movement, the lug 32 will engage the arm 31, tilting the bar 27 and elevating the stops 28 to release any key which may have been locked in a depressed position. Preferably a small finger-piece or handle 34 (Fig. 8) is connected with the bar 27 and extends out through a slot in the face of the machine, so that said bar can be tilted by the operator when desired, to release any key. This is of especial importance when any key has been erroneously depressed, and permits the restoration of the parts of the machine to normal position without effecting any registration. The handle 34 may be removed when desired. The stops 28 are preferably surrounded above and below by two bars 35 which are properly spaced and which act as guides for such stops and permit the slight elevation of any stop under the action of the depressed key.

Mounted back of the keys are the tablet-bars 36 carrying the usual tablets at their upper ends. These tablet-bars correspond in number and location with the keys. Each tablet-bar, as shown particularly in Fig. 9, is made by preference in two sections 37 and 38, the former inclosing the latter, as shown. The section 37 is made of sheet metal bent back on itself to form a channel, in which the section 38 works. The section 38 of each tablet-rod is provided at its upper end with a finger 39 Fig. 9 resting upon the upper edge of the channel section 37 thereof, and is guided in its vertical movements in such channel by the inturned fingers 40 thereof, as shown particularly in Fig. 8. The section 38 is provided with a tooth 41, by which it will be retained in elevated position, as explained. Pivoted in the channel section 37 of each tablet-bar is a foot 42 having a toe 43 adapted to be moved into the path of movement of the tablet-elevating bar 24. The foot 42 is maintained in its normal position out of the path of movement of said bar by a spring 44 holding said foot normally in contact with a pin 45 working in a slot. The lower end of each key 12 is continued to engage the foot 42 of each tablet-bar so as to operate the same. The tablets are maintained in an elevated position by means of fingers 46, one for each tablet. Such fingers engage beneath the teeth 41 on the upper sections 38 of the tablet-bars. When the tablet-elevating bar 24 is lowered upon the negative stroke of the machine, the section 37 of each tablet-bar descends with it until a shoulder 47 on said section (see Figs. 3, 4 and 7) engages the plate 48 in which the tablet-bars work, allowing the tablet-elevating bar to descend out of engagement with the toe 43, and allowing the foot 42 to be again moved in position to be actuated by the key. The special construction of tablet-bar which I have explained is of importance in connection with those cash registers of the Osborn type, where the dropping of the tablet is effected upon the preliminary movement of the till-cover or the actuating-bar therefor. It will be seen that if the exposed tablet is dropped, assuming the corresponding key to be depressed, the foot of said tablet-bar will require to be first moved outward into the path of movement of the tablet-elevating-bar, and there will be danger of the tablet-elevating bar being elevated above the line of the foot of the tablet-bar which is thus released and thereby failing to engage the same. By making the tablet-rod in two sections as I have explained, the lower section thereof carrying the foot is always in position to be operated by one of the keys, whether the corresponding tablet is exposed or not, so that the objection I have indicated is effectively removed.

In order to drop the tablets from an exposed position, any suitable mechanism may be employed. That illustrated operates upon the preliminary movement of the operating-bar 6, and is shown particularly in Figs. 26, 27 and 28. The fingers 46 for locking the tablets in the exposed position are all caried on a rock-shaft 49 mounted in the side frames. Connected to the rock-shaft at one side is an arm 50 located adjacent to one of the segments 9 of the operating-bar 6. Carried in the end of this arm 50 is a finger 51 normally spring-pressed downward. A lug 52 on the adjacent segment 9 is adapted to engage with this finger. When the parts are in the closed position, the lug 52 will be located in a plane above the finger, as shown in Fig. 26. As the operating-bar 6 is moved downward, the said lug will engage the finger, tilting the rock-shaft 49 and withdrawing the fingers 46 from the tablet-bars, thereby allowing the latter to drop either by gravity or by spring pressure. Upon the return movement, the lug 52 engages beneath the finger 51 and elevates it without disturbing the tablet. This operation preferably takes place near the commencement of the movement of the operating-bar 6. Instead of releasing the tablets by mechanism of this kind, it will be understood that the tablets may be dropped by the direct movement of the keys, as is common, or by the opening movement of the till-cover, or in any other suitable way.

The apparatus is provided with counters for keeping separately the number of the different classes of transactions entered in the machine. As shown the different classes entered in the machine are cash transactions and no-sale transactions, the former being indicated individually and the total thereof accumulated, while the latter are entered by alone indicating the transactions as they occur. At the present time it is common in the art to provide cash registers with counters for this purpose, but so far as I am aware, the sales or customer counter is always operated with the no-sale counter, so that in order to ascertain the number of sales, it is necessary to subtract from the amount indicated by the customer counter, the amount indicated by the no-sale counter. My improved mechanism obviates this defect, and by its means I am enabled to produce a device wherein independent records are kept of these two operations.

Referring particularly to Figs. 14 to 17 inclusive, 53 represents the customer counter, and 54 the no-sale counter. These counters comprise the usual disks having numbers thereon, and are mounted on the same shaft 55 in the frame 56. I illustrate the customer counter as being provided with four disks, and the no-sale counter with three disks. The disks of the no-sale counter are operated by means of pawls 57, which are of the ordinary deep-toothed variety and need not be described in detail. These pawls are carried on a rocking arm 58 mounted on a bar 59 and provided with a rearward extension 60. This extension 60 is adapted to be engaged by a lug 61 carried on the tablet-rod 62 corresponding to the no-sale key, so that each time the no-sale key is depressed and its tablet-rod is elevated by the disclosure of the money drawer, the lug 61 will engage the extension 60, operating the pawls 57 and feeding the no-sale counter one step. The disks of the customer counter are operated by pawls 63 carried on a rock-arm 64 mounted on the same shaft 59 and having an extension 65 adapted to be engaged by a lug 66 on a slide 67. This slide is connected with the tablet-elevating bar, and operates at every positive stroke of the machine, including that following the depression of the no-sale key. It will be observed that when any key (except the no-sale key) is depressed and the tablet-elevating bar is elevated, the lug 66 will engage the extension 65, swinging the rock-arm 64 and engaging the pawls 63 with the disks of the customer counter, advancing that counter one step. In order to prevent the customer counter from operating when the no-sale key is depressed, I provide connections between the rock-arms 58 and 64 to throw the pawls 63 out of operation when the rock-arm 58 is moved. The rock-arm 58 is therefore connected by a link 68 with a bell-crank 69 having a finger which engages an arm 70 on the shaft of pawls 63. When therefore the rock-arm 58 is elevated to feed the no-sale counter, the bell-crank 69 will be moved, causing the finger thereof to depress the arm 70 and withdrawing the pawls 63 from the disks of the customer counter, so that although the tablet-elevating bar will elevate the pawls 63, they will be out of engagement with the customer counter disks and will not operate them. These parts will be so proportioned that the rock-arm 58 will be always moved before the lug 66 engages the extension 65 of the arm 64 to insure the disengagement of the pawls 63 from the disks of the customer counter before said pawls are operated. The several disks, both of the no-sale counter and the customer counter, are provided with the usual pawls 71 to prevent return movement thereof.

The totalizer which will now be described comprises a plurality of movable elements such as disks 72 which are mounted upon the same shaft 55 as the cash sale and no sale counters. Six of these disks are shown, representing units, tens, hundreds, thousands, tens of thousands, and hundreds of thousands, respectively. The first four of the disks are provided with gears 73, by which the said disks may be operated directly through the tablet-bars of the keys of any bank. The gear 73 for the units disk engages with a gear 74 on a sleeve 75, said sleeve being mounted on a shaft 76 extending below the shaft 55; the gear 73 for the tens disk is operated by a gear 77 on a sleeve 78 carried on said shaft 76; the gear for the hundreds disk is operated by a gear 79 mounted on a sleeve 80 carried on said shaft 76; and the gear for the thousands disk is operated by a gear 81 carried on a sleeve 82 which is also mounted on said shaft. The gears 74, 77, 79 and 81 are each provided with a series of ratchet teeth 83, as shown in Fig. 12. Engaging with these teeth of each gear is a pawl 84, as shown in Fig. 11. The pawls for the gears 74 and 81 are carried by the sleeves 75 and 82 respectively. The pawls for operating the ratchet teeth of the gears 77 and 79 are carried by gears 85 and 86 respectively, mounted loosely on the sleeves 78 and 80. By means of the ratchet and pawl connection with the gears 74, 77, 79 and 81, the said gears are turned positively in one direction only by the rotation of the sleeves 75 and 82 or the gears 85 and 86, but are not turned upon the return movement of said sleeves or gears. The sleeve 75 is rotated by a gear 87, and the sleeve 82 is rotated by a gear 88. The gears 87, 85, 86 and 88 are operated by segments 89, 90, 91 and 92 respectively, as shown particularly in Fig. 10. When the machine is not provided with a printing attachment, the several toothed segments may be connected to sleeves loosely mounted on a shaft 93. When, however, a printing apparatus is used, as I will explain, the sleeves for these toothed segments are arranged concentrically one on the other, and connect with the sections of a printing arc or wheel.

Each of the segments 89, 90, 91 and 92 constitutes one of the arms of a swinging frame comprising the rods 94, 95, 96 and 97, the other element of the frame being composed of an arm 98 secured to the sleeve. The several tilting frames are adapted to be operated to the proper extent dependent upon the particular key depressed. Preferably these frames are operated by the tablet-elevating bars. To this end, each bar is provided on its rear face with a stop or lug 99, the stops on the tablet-bars of the different banks being arranged in successively increasing planes, as shown particularly in Fig. 2. This is a common arrangement, it being obvious that any of the lifting frames will be moved to an extent dependent upon the key which is depressed, communicating its motion to the gear 74, 77, 79 or 81 according to the bank in which the depressed key is located. By arranging the total adding mechanism as I have explained, and by connecting the disks of the first four orders with gears operated directly from four lifting frames, it is possible to make use of only a single counter-shaft, in this instance the shaft 76, for carrying the intermediate mechanism, thereby materially simplifying and improving the construction and efficiency of the apparatus. It will be noted that by this arrangement the registering disks are located in the machine at a point opposite the point where the two inner actuator frames meet. Return movement of the several register disks in the total adding mechanism is prevented by the ordinary return-pawl 100 arranged in the usual way.

In order to carry from disks of lower order to disks of higher order, I make use of improved carrying mechanism. Mounted upon the shaft 101 in the frame 102 of the total adder are four sleeves (with a total adding mechanism of the capacity shown) 103, 104, 105 and 106 (see Fig. 13). Each sleeve carries a pawl-carrying frame 107, shown particularly in Figs. 18 to 22 inclusive. These pawl-carrying frames are made preferably essentially triangular in shape, and at their lower inner ends each frame carries a pawl 108 for carrying from units to tens, from ten to hundreds, from hundreds to thousands, and from thousands to tens of thousands. These carrying-pawls coöperate with ratchet-wheels 109 on the disks of higher order. 110 is a cam shaft extending transverse of the pawl-carrying frames and carrying cams for the operation of said frames. One of these cams 111 (see Fig. 18) is essentially circular in form, having a cut-away portion, and coöperating therewith is a roller 112 on the pawl-carrying frame. Mounted on the cam shaft adjacent to each of the cams 111 is a cam 113 having a finger arranged opposite the cut-away portion on the cam 111, which finger engages a roller 114 to elevate the pawl-carrying frame when the roller 112 is in line with the cutaway portion on the cam 111. The engagement of the active surface of the cam 111 with the roller 112 returns the pawl-carrying frame to its former position. The several cams 111 and 113 are preferably arranged on the cam shaft in succession, so that the operation of the several carrying-pawls takes place successively instead of simultaneously. The successive arrangement of the cams on the cam shaft is very clearly shown in Fig. 45. Each carrying-pawl 108 is provided with a tail 115, which, when the carrying-pawl has been released to engage the disk of higher order, will be located adjacent to the cam shaft. In order to return the carrying-pawl to its normal position out of engagement with the disk of higher order, I employ for each pawl a cam 116 which engages the tail 115 to return the pawl. A spring 117 tends to throw the pawl into engagement with the disk of higher order when it is released. Each carrying-pawl is normally maintained out of engagement with the disk of higher order by a finger 118 mounted on the shaft 55 between the register disks. This finger is provided with a tooth 119 engaging a notch 120 in each carrying-pawl. When the tooth 119 is in engagement with this notch, the elevation of the pawls carries them away from the teeth 109 of the disk of higher order, and the pawls are thereby inactive throughout their entire throw. In order to render the pawls active for the carrying operation, I provide each finger 118 with a downturned projection 121 which is adapted to be engaged by a finger 122 carried with the adjacent disk of lower order. The finger 122 is so located with respect to each of the disks of lower order as to engage the carrying-pawls of the disk of higher order when the disk of lower order discloses the cipher, it being obvious that the engagement between the finger 122 and the extension 121 will elevate the tooth 119 from the fork 120, allowing the spring 117 to throw the carrying-pawl into operation with the teeth 109 of the disk of higher order. Each of the swinging fingers 118, as shown in Fig. 6, is provided with a pin 122ª thereon, so located that when the finger is tripped by the cam finger 122 on the shaft 76, the notch 120 of the carrying pawl will engage with said pin, whereby the carrying pawl will be held in its engagement with the ratchet of the disk of higher order during its entire throw, and overthrow will be prevented, as will be obvious.

The carrying mechanism is arranged, in a cash register of the Osborn type, so as to be operative upon the negative stroke. This is necessary because with the mechanism described, the disks corresponding with the four tilting frames are operated upon the positive stroke. Preferably this operation of the cam shaft is effected by the return movement of the till-cover or the operating-bar therefor, and in the drawings, and particularly Figs. 32 to 35 inclusive and also Fig. 4, I illustrate the mechanism for effecting this operation. Mounted on a stub-shaft at one side of the machine is a toothed segment 123 having a rearwardly-extending arm 124 which connects with the link 33 before referred to. (See Figs. 4 and 32 to 35.) The segment 123 engages a pinion 125 mounted loosely on the cam shaft. The said cam shaft carries a fast sleeve 126 near this end of the apparatus, and said sleeve is provided with a channel 127 therein, with which a spring-pressed pawl 128 may engage. The said pawl is carried with the pinion 125. In order to lock the cam shaft normally against rotation in either direction, to prevent it from turning by the friction of the pinion 125 as it is rotated on the positive stroke, and to prevent it from rebounding in the other direction after stoppage, I employ a latch 129 mounted concentrically with the toothed segment 123, which latch engages the channel 127 in the sleeve 126 and normally locks it. It will be understood that the latch 129 must release the said cam shaft when the pinion has been turned to engage the pawl 128 in the channel 127, and to effect this I provide the latch with a pin 130, with which a pin 131 on the segment 123 engages near the end of the positive stroke of such segment. The latch 129 is normally elevated by a spring 132. It will be seen that when the operating-bar of the machine is moved downward to elevate the tablet-elevating bar, the link 33 will elevate the arm 124, operating the segment 123 and turning the pinion 125 one complete turn. The pawl 128 will therefore leave the channel 127 in the sleeve 126, be swung entirely around said sleeve, and again engage said channel, as shown in Fig. 35. Near the completion of the movement of the segment 123, the pins 130 and 131 will engage together, withdrawing the latch from the cam shaft, whereupon when the operating-bar 6 of the machine is returned to its normal position, the link 33 will return the segment, rotating the pinion 125 and carrying the cam shaft one complete turn. As soon as the pins 130 and 131 separate, the latch 129 is again moved upward, but by the time it engages the sleeve 126, the channel 127 will have passed beneath it, and said channel will not be engaged by the latch until the cam shaft has made a complete rotation when the latch again enters the channel, locking the cam-shaft against overthrow or rebound. The particular operations which take place by the rotating of the cam shaft will be explained when the complete operation of the device is described.

In operating the total adding mechanism from the tablet-elevating bar as explained, there is danger of the register wheels being overthrown by a rapid movement of the operating handle, thereby resulting in false registration. I overcome this possible defect by means of an overthrow-brake which I will now describe. Mounted above all the return-pawls 100 of the register disks of the total adder, is a bar 133 (see Figs. 3 and 7) carried in a tilting frame 134 mounted on a pivot 135. This frame is tilted at its rear end by a rod 136. Mounted on the lower end of this rod is a sleeve 137 slotted onto the rod, as shown, and normally pressed downward by a spring 138 surrounding the rod. The sleeve 137 is adapted to be engaged by the tablet-elevating bar 24 at the proper moment. As said bar is elevated, it engages the sleeve 137, tilting the frame 134 and bringing the brake-bar 133 onto the return-pawls 100 of the register. By reason of the spring 138 between the tablet-elevating bar and the brake-bar, a sufficient play is allowed for any final movements of the return-pawls, it being understood that the brake-bar is not brought into engagement with the return-pawls until near the completion of movement of the lifting frames, so as not to produce unnecessary wear on the return-pawls.

The resetting mechanism for the total adder which I have invented is of novel and effective construction. It has few parts, and possesses the manifest advantage of enabling a resetting operation to be effected by the direct and usual operation of the machine, that is to say in the present case, by the depression of a key and the disclosure of the money receptacle. When one or more special counters, as for instance the no-sale counter and the customer counter already described, are used, the additional advantage is secured of effecting a resetting operation of all of the counters by one and the same manipulation.

So far as I know, it is broadly new to provide means for simultaneously resetting a total adder and a special counter, and I shall claim the same without regard to the particular mechanism which may be used, and also whether operated by the direct operation of the machine or in any other way.

As I have explained, the total adding mechanism and the special counters are all carried on the same shaft 55. Mounted loosely on the end of this shaft is a pinion 139 (see Figs. 1, 29, 30 and 31), which pinion carries one member of a jaw-clutch 140, the other member of said clutch being carried on a sleeve 141 slotted at 142. Working in this slot is a screw 143 connected to the shaft 55 whereby the rotation of the sleeve will turn the shaft, while at the same time the sleeve will be free to move longitudinally on the shaft. In order to normally lock the shaft 55 against rotation, the sleeve is provided with a slot 144 at one end (see Figs. 30 and 31), with which a stationary stud 145 engages. The stud 145 is carried on the frame of a lock 146 of suitable construction, an ordinary Yale lock being illustrated. The bolt 147 of this lock connects with the sleeve 141 so as to slide it on the shaft 55 and to engage the clutch-members 140. In this movement, the slot 144 is disengaged from the pin 145 so as to free the shaft 55 and allow it to be rotated.

The bolt 147 is provided with a finger 148 engaging a pawl 149 of a register 150 of any suitable type, whereby each movement of the bolt 147 to engage the clutch-members will be registered on said register, thereby giving a registration of the number of times the several counters are reset. The pinion 139 is arranged to be operated a complete turn during each operation of the machine, this being preferably effected through connections with the tablet-elevating bar, as shown particularly in Fig. 5. Mounted loosely on the shaft 76 is a pinion 151, with which a segment 152 engages.

153 is a slide connected at its lower end to the tablet-elevating bar 24, and carrying a slotted head in which works a roller 154 on the segment 152. The parts are so proportioned that at each up-and-down movement of the tablet-elevating bar, the pinion 139 will be given a complete rotation in one direction and then returned to its normal position. This rotation of the shaft 55 effects the resetting of the disks of the several counters by a pawl mechanism illustrated particularly in Figs. 23 and 24. Each disk of all the counters is provided on its interior and under the rim thereof with a stud 155, with which a pawl 156 engages. Said pawl is carried on an arm 157 keyed to the shaft 55, which pawl 156 is normally pressed outward by a spring, not shown. The rotation of the several disks in operation is in the same direction as the active movement of the pawls 156, so that when the fingers 155 pass the corresponding pawls, the latter will be depressed. When, however, the shaft 55 is turned in the same direction as the disks are operated, the pawls 156 for the disks will engage the fingers 155, carrying all of the disks around so as to disclose the naughts thereon (except on the tens and higher disks of the total adding register), thereby effecting the resetting operation. This resetting takes place when the clutch-members 140 are engaged and when the tablet-elevating bar is elevated the disks of all the counters will be reset simultaneously.

It is to be observed that with the total adding register, the positive stroke of the resetting shaft, restores the units disk to zero, all the others indicating "9," and on the negative stroke the carrying devices move each of said other disks forward one step, disclosing zero. With the other counters, the entire resetting takes place on the positive stroke, no separate carrying devices being employed from disk to disk.

The several tilting frames can be returned to their normal positions when the tablet-elevating bar 24 is lowered, either by gravity or by spring-pressure. I prefer, however to depress these tilting frames by a direct connection, and to this end I connect each of said tilting frames to the tablet-elevating bar by a link 158 passing through the tablet-elevating bar, as shown particularly in Figs. 2, 3 and 4, thus allowing the tablet-elevating bar to move with respect to the several tilting frames until the engagement between the said frames and the lugs 99, and effecting a positive return of the tilting frames by the downward movement of the tablet-elevating bar. Any suitable bell mechanism may be employed, that shown particularly in Fig. 2 being effective. The bell 159 is carried at the back of the machine, and is provided with a pivoted hammer 160. At the end of said hammer is a pawl 161, with which a lug 162 on the bar 33 engages. In being elevated, the lug 162 engages the pawl to actuate the bell hammer, but in being lowered, the said lug operates the pawl on its pivot. The hammer 160 is provided with a downwardly-extending arm 163, with which an adjusting screw 164 engages. By operating said screw, the loudness of tone of the bell may be regulated, or the bell may be thrown entirely out of operation, as will be understood.

Preferably the register is provided with mechanism for effecting a printed record of all the sales made and the amounts of such sales, as is common in the art, and the printing mechanism which I prefer to employ is illustrated in Figs. 41, 42, 43 and 44. When a printing mechanism is used, the sleeves on the several tilting frames are differently arranged from that already described and illustrated particularly in Fig. 1. Referring to Fig. 41, I secure the sleeve of the segment 89 rigidly to the shaft 93. On the end of said shaft is a segment 165 carrying a series of type on its periphery representing units. The sleeve connected to the segment 90 surrounds the shaft 93 and carries at its end a printing segment 166. The sleeves connected with the segments 91 and 92 respectively are arranged concentrically on the first mentioned sleeve, as illustrated, and carry printing segments 167 and 168. The numbers on the several printing segments 165, 166, 167 and 168 are so disposed as to present to the action of an impression roller the number corresponding to the key depressed. Mounted on the side of the apparatus on a shaft 169 is a printing-frame 170 carrying an impression roller 171 at its upper end. Carried below the casing is a reel of paper the end of the strip passing between the impression roller 171 and a pressure roller 185. The impression roller 171 is provided with a feed ratchet 174, with which a pawl 175 engages, whereby as the printing-frame is swung on the shaft 169, the feed pawl 175 will engage the ratchet and feed the impression roller forward one step. This operation of the printing-frame is effected preferably through the action of one of the segments 9 of the operating-bar 6 for the till-cover, said segment being provided with a plate 176 (see Fig. 42) thereon, having fingers 177, 177, which engage an arm 178 at the bottom of the tilting frame, said arm working in a slot 179 in the side of the register.

To effect the inking of the type on the several printing segments, I employ an inking-frame 180 pivoted at the side of the device and composed of two sections pivoted together, as shown, so as to yield slightly. The inking-frame carries an inking roller 181 at its extreme end, said inking roller being adapted to be forced down between the impression roller and the type to ink the latter, but to be withdrawn from that position immediately before the impression roller strikes the type. To effect this result, I provide the inking-frame with an arm 182, which is connected with the printing-frame by a link 183, as shown, whereby when the printing-frame is retracted from the type-wheels the inking-frame will be brought into contact with said wheels. The inking roller preferably, is carried in its downward movement beyond the point of contact with the type segment so that it will not rest with full pressure against the type when the machine is at rest. Such contact is deleterious to the roller and is especially provided against in this construction. In order to ink the inking roller 181, I provide an ink roll 184, (see Fig. 42,) secured to the side of the machine and with which the inking roller comes in contact each time it is withdrawn from the type segments. The ink roll 184 is covered with any suitable ink-retaining substance of a textile nature, and is suitably inked from time to time.

The entire printing apparatus may be, and preferably is inclosed by a light metal casing 185 (shown particularly in section, Fig. 42) secured to the side of the apparatus and having a hinged upper portion which may be opened to disclose the printing mechanism.

If desired, a drawer may be provided which can be used in addition to the stationary till or in substitution therefor, preferably the former, in which case the drawer will be used as a receptacle for bills, the money receptacle containing the necessary change. When a cash register is employed with a stationary till and a cover movable toward the rear of the machine as I have explained, the vertical height of the machine is materially shortened, since it does not become necessary to move the cover down in front of and beneath the receptacle, as is the case with machines of this type employing a forwardly movable cover. It therefore becomes possible to make use of a money drawer located beneath the stationary till without increasing the vertical dimensions of the machine. Preferably the money drawer is so constructed as to coöperate with the till-cover, whereby one will control the other as I will explain.

Referring to Figs. 36 to 40 inclusive, 186 represents a rectangular money drawer located beneath the stationary till and mounted to slide in a horizontal plane. This money drawer is provided at the sides with two stationary tracks 187 which bear upon rollers 188 secured to the sides of the machine. At its back it is provided with a single roller 189 carried in lugs depending from plate 190 and bearing on a track 191 secured in place to the front and back of the register. The lugs which carry the roller 189 are provided with inturned fingers 192 (see Fig. 40) which grip beneath the track 191 and serve to effectively guide the money drawer and enable it to be opened and closed easily. 193 represents a latch-plate slidably mounted on the plate 190, as shown, and having a latch 194 engaging a notch 195 in the track 191. This engagement maintains the money drawer in a closed position until it is released. The latch-plate 193 is provided with a finger 196, with which a finger 197 is adapted to engage near the close and at the end of the positive stroke of the machine. The finger 197 is preferably carried on the bar 22 which connects with the tablet-elevating bar as already explained. One of the tracks 187 carried by the drawer is provided with a notch 198 therein, with which coöperates a rim 199, the latter being carried on the adjacent segment 9 to which the operating-bar 6 is connected. When the drawer 186 is closed, the rim 199 will be located in line with the recess 198, as shown in Figs. 37 and 38, so that the operating-bar 6 can be moved and released by the depression of a key. If, however, the money drawer is not closed, the operating-bar 6 cannot be moved, since the rim 199 will engage with the track 187. It therefore is necessary to close the drawer 186 before the till-cover can be operated. When the money drawer is used in connection with a cash register having a directly moved till-cover, it will be understood that the rim 199 is to be carried directly by the cover instead of by the operating mechanism therefor. The rim 199 is provided with a notch 200 therein, which is adapted to register with the track 187 only when the said rim is moved to its full open position to disclose the stationary till. In this position the money drawer can be opened, but at any intermediate position it will be observed that the money drawer will be locked against movement. The parts coöperating with the money drawer 186 already described will be preferably so proportioned that as the tablet-elevating bar approaches the end of its upward movement, the lug 197 will engage the lug 196, elevating the latch 194 and allowing the money drawer to be opened by hand or to be forced open by a spring or other motive device, as is common.

The operation of my improved cash register and the component parts thereof will be as follows: Upon the depression of any key or a single key in several of the banks, the wedge-shaped upper end of the arm 14 will separate two of the stops 28 so as to enter between them. This will also slightly elevate the stops to allow the arm 14 to pass in front of the locking-head 30. This locks the key in its depressed position (see the right-hand key Fig. 8). The depression of the key also tilts the bell-crank 16 to disengage the tooth 18 from the notched plate 19, thereby releasing the operating-bar 6. The operating-bar can be now moved downward, being provided with the usual pawl mechanism to prevent return movement before the completion of a full stroke. In moving downward, the lug 10 engages the latch 8, withdrawing it from the stud 7 and freeing the till-cover near the completion of the downward movement of the bar 6. The till-cover is then pulled open by the spring 11. When the bar is returned to its normal position, the link 25 will return the till-cover as I have explained. Near the completion of the downward movement of the operating-bar 6, the arm 31 on the bar 27 is engaged by the stop 32, whereby the bar 27 is tilted, thus withdrawing the key detent from the arm 14 of the depressed key and allowing the key to be returned to its normal position by the usual spring. This releasing of the key can take place at any time provided it occurs after the engagement with the tablet-elevating bar of the toe 43 of the selected tablet-rod. If a key is erroneously depressed, it may be reset by operating the finger-piece 34 to tilt the bar 27, returning the parts to their normal positions without effecting any registration. If a tablet is in an elevated position, with the special mechanism described the preliminary movement of the bar 6 will engage the lug 52 with the pawl 51, tilting the rock-shaft 49 and withdrawing the fingers 46, thus freeing any tablet which may be elevated at the very commencement of the operation. The movement of the bar 6 elevates the tablet-bar, and any tablets the feet of which may have been operated by one or more of the keys, will be correspondingly elevated and locked in the elevated position by the engagement of the fingers 46 beneath the teeth 41 of the tablet-bars. The upper section of the tablet-bar will thus be locked in an elevated position, but upon the downward movement of the tablet-elevating bar, the lower section of the tablet bar will descend with the bar, so as to be ready to be operated by the same key if desired. The movement of the tablet-elevating bar causes the lug 197 near the completion of the up stroke to engage the lug 196 to withdraw the latch 194 and allow the money drawer 186 to be opened, if used. The elevation of the tablet-elevating bar operates the slide 67, swinging the arm 64 and operating the pawls 63 for the customer register, assuming of course that a bona fide sale has been made. If the key depressed was the no-sale key, the slide 62 on the no-sale tablet-bar will be elevated, and the lug 61 will engage with the extension 60 of the arm 58 before the lug 66 engages the extension 65 of the arm 64. This successive movement is effected because of the slot and pin connection between the lower end of the slide 67 and the bar 24, as shown in Fig. 2, which allows an independent movement of said bar before the elevation of the slide is commenced. The preliminary movement of the arm 58 will, through the link 68 and bell-crank 69, retract the pawls 63 of the customer counter, so that although the operation of the tablet-elevating bar will cause the pawls 63 to be elevated, they will not engage the customer counter and no registration will be effected thereon. I thus secure a complete registration of actual sales and of no sales, doing away with the necessity of any calculation to determine one or the other result.

The elevation of the tablet-bars will engage one or more of the lugs 99 with the corresponding tilting frames, and one or more of said tilting frames will be moved to an extent dependent upon the particular key depressed. Assuming the five cent key to be depressed, the tilting frame 94 will be elevated to rotate the gear 87, sleeve 75, gear 74, and the units disk of the total adder an extent of five teeth. The same is true of the other tilting frames, or when several of the tilting frames are operated together. Each time the tablet-elevating bar is moved upward, the segment 123 will be operated to move the pawl 128 around with respect to the cam shaft and to engage it with the channel 127 in the sleeve 126. Near the completion of this movement, the latch 129 will be withdrawn, as explained. On the return movement, the pawl 128 will carry the cam shaft one complete turn, and the several cams 111 and 113 engaging the rollers 112 and 114 of the several pawl-carrying frames, will actuate said frames to move all the carrying pawls first up and then down. Assuming that during the positive stroke of the machine the tilting frames had moved one of the disks past the 0 thereon, the finger 122 carried with said disk will have engaged the projection 121 on the finger 118 to elevate the tooth 119 from the fork 120 of the carrying-pawl 108 for the disk of the next higher order, and said carrying-pawl will be forced by the spring 117 into contact with the ratchet-wheel of said disk. If therefore the cam shaft is given a complete rotation on the negative stroke of the machine, the pawl-carrying frame of said carrying-pawl will operate the pawl to advance the disk of next higher order one step. After this operation takes place, and at any time before the cam shaft is brought to rest, the cam 116 will engage the tail 115 of the carrying-pawl which is thus operated, and will return the pawl, so as to be again engaged by the tooth 119 of the finger 118. This holds the pawl out of operation with its disk until the disk of lower order has again been advanced until it passes the 0, whereupon the carrying operation will be repeated. I have not described the carrying-pawl for the disks above that representing tens of thousands, but it will be understood that any well known arrangement for this purpose may be employed, such as a deep-toothed pawl.

The tablet-elevating bar 24 in being elevated near the completion of its movement will engage the sleeve 137 to depress the brake-bar 133 onto the return-pawls 100, thus resisting the rotation of the several disks and preventing any possibility of overthrow thereof. When it is desired to reset the register disks of the total adder and the disks of any special counter or counters which may be used, the lock 146 is operated, engaging the two sections of the clutch 140. This also unlocks the shaft 55 as explained, and effects a registration on the counter 150. When, now, the tablet-elevating bar 24 is operated (the handle 6 being released by the depression of a key), the slide 153 will operate the segment 152, rotating the shaft 55 one complete turn. In this rotation, all the pawls 156 will pick up the several register disks and turn them around to zero. Upon the return movement of the shaft 55, the pawls 156 will be withdrawn from the fingers 155 and will pass entirely around and again over said fingers. The lock 146 is now again operated to release the clutch-members, and the device is ready for a new operation.

Where printing mechanism is employed, as is preferable, it will be seen that the operation of the several tilting frames will move the printing segments 165, 166, 167 and 168 to an extent dependent upon the movement of said frames, bringing in position the proper number or numbers in front of the strip of paper from the reel 172. When the operating-bar 6 is moved downward, the segment 9 will carry the plate 176, engaging the projection 178, and tilting the printing frame to force the paper on the impression roller into contact with the type. On the return movement of the operating-bar, the printing frame will be retracted, causing the pawl 175 to engage the ratchet 174 and feed the paper forward. In this retracted movement of the printing frame, the link 183 will depress the inking-frame, carrying the inking roller 181 into contact with the several printing segments, so that upon the next operation, the turning of the printing segments to the printing point will result in an effective inking thereof. When the printing-frame is moved as explained, to engage the paper with the printing segments, the link 183 will withdraw the inking-frame, engaging the inking roller 181 with the ink roll 184, so as to reink the former.

Having now described my invention, what I claim as new and desire to secure by Letters Patent is as follows:

1. In a cash register the combination with a series of keys, of a series of key stops arranged to hold the keys in operated position and constructed to prevent the operation of more than one key at once in the same bank, a rock bar on which said stops are pivotally mounted and means to rock said bar for disengaging the stops from the keys.

2. In a cash register the combination with a registering mechanism, of an operating bar for the same, a cash drawer and means carried by the bar and coöperating with the cash drawer to prevent the opening of the latter until the bar has completed its positive stroke.

3. In a cash register the combination with a register, of a register operating mechanism, turn-to-zero devices for the register normally independent of the operating mechanism and means for coupling the turn-to-zero devices to the operating mechanism whereby a single regular operation of the latter will return the register to zero.

4. In a cash register the combination with register operating segments and means for differentially moving the same, of a series of register disks, transfer pawls, and trip-arms or fingers for said pawls constructed to hold them, when tripped, to engagement with the register disks to prevent overthrow of the latter.

5. In a cash register, the combination of a total adding mechanism, a series of selective keys arranged in banks, a series of tablet rods arranged in banks, a register operating device corresponding to each bank, a primary actuator adapted to operate the said operating devices graduated distances determined by said keys and tablets, a countershaft adjacent to the total adding mechanism, sleeves on the countershaft, connections between the sleeves and the adding mechanism, connections between the register operating devices and said sleeves, a printing device for each register operating device, and connections between the register operating devices and the printing devices, substantially as set forth.

6. In a cash register, the combination with a series of keys arranged in a plurality of banks, a series of tablet rods, and a lifting frame corresponding to each bank, of a total adding register having a series of register disks, a countershaft adjacent thereto, sleeves on the countershaft, connections between the sleeves and the register disks, connections between the lifting frames and said sleeves, and a series of printing devices corresponding to and forming fixed parts of the lifting frames, substantially as set forth.

7. In a cash register the combination of a series of keys divided into banks, a series of corresponding key stops arranged to prevent the operation of more than one key at a time in each bank, projections on the stops for locking the keys in their depressed positions, a rock bar on which said stops are pivotally mounted and means to rock said bar for disengaging the stops from the depressed keys.

8. In a cash register the combination with a series of keys, of a series of tablet rods, a stationary till, a movable cover therefor, an operating bar for releasing the cover, connections between said bar and the tablet rods, a movable latch for holding the tablets elevated, and means connecting said latch to said bar.

9. A cash register including in its operating elements a rotary shaft, a segment for rotating said shaft, devices for normally locking the shaft against rotation and means carried by the segment for operating the locking devices.

10. In a cash register the combination with a series of register disks, a series of carrying elements, a shaft for operating said elements, a segment for rotating the shaft, devices for normally locking the shaft against rotation, and means carried by the segment for operating the locking devices.

11. In a cash register, the combination of a total adding mechanism, a series of selective keys arranged in banks, a series of tablet rods arranged in banks, a register operating device corresponding to each bank, a primary actuator adapted to operate the said operating devices graduated distances determined by said keys and tablets, a countershaft adjacent to the adding mechanism, sleeves on the countershaft, gears on said sleeves for positively driving the register disks of the adding mechanism, ratchet connections between said gears and sleeves, and connections between the register operating devices and said sleeves, substantially as set forth.

12. In a cash register, the combination of a total adding mechanism, a series of selective keys arranged in banks, a series of tablet rods arranged in banks, a lifting frame corresponding to each bank, a primary actuator adapted to operate the said lifting frames graduated distances determined by said keys and tablets, a counter-shaft adjacent to the adding mechanism, sleeves on the countershaft, gears on said sleeves for positively driving the register disks of the adding mechanism, ratchet connections between said gears and sleeves, and connections between the lifting frames and said sleeves, substantially as set forth.

13. In a cash register, the combination with a series of keys arranged in four banks representing units, tens, hundreds and thousands, a series of tablet-rods, and a lifting frame corresponding to each bank, of a total adding register having a series of register disks placed side by side, a counter-shaft adjacent thereto, sleeves on the counter-shaft, gears on said sleeves for positively rotating the corresponding disks, ratchet connections between said sleeves and said gears, and connections between the lifting frames and said sleeves, substantially as set forth.

14. In a cash register, the combination with a primary actuator, a series of keys arranged in a plurality of banks, a series of tablet rods, and a register operating device corresponding to each bank, of a total adding register having a series of register disks, a counter-shaft adjacent thereto, sleeves on the counter-shaft, gears on said sleeves for positively driving the corresponding disks, ratchet connections between said sleeves and said gears, connections between the register operating devices and said sleeves, and connections between the primary actuator and said register operating devices, substantially as set forth.

15. In a cash register, the combination with a primary actuator, a series of keys arranged in a plurality of banks, a series of tablet-rods, a lifting frame corresponding to each bank, and stops on the tablet-rods for engaging with and operating the corresponding lifting frames, of a total adding register having a series of register disks, a counter-shaft adjacent thereto, sleeves on the counter-shaft, gears on said sleeves for positively rotating the corresponding disks, ratchet connections between said gears and said sleeves, and connections between the lifting frames and said sleeves, substantially as set forth.

16. In a cash register or analogous device, the combination with a series of keys, of a total adding register comprising a series of register disks, a series of carrying-pawls, means for operating said pawls, a series of corresponding swinging fingers mounted on the register shaft and normally sustaining the pawls out of engagement with the corresponding register disks, projections on the fingers for locking the pawls to the register disks during the transfer, and means controlled by the disks of lower order for disengaging the fingers from said pawls, substantially as set forth.

17. In a cash register or analogous device, the combination with a series of keys, of a total adding register comprising a series of register disks, a series of carrying-pawls, means for operating said pawls, a series of corresponding swinging fingers mounted on the register shaft and normally sustaining the pawls out of engagement with the corresponding register disks, projections on the fingers for locking the pawls to the register disks during the transfer, means controlled by the disks of lower order for disengaging the fingers from said pawls, and means for resetting the pawls to again engage the fingers therewith, substantially as set forth.

18. In a total adding register, the combination with a series of carrying-pawls, and means for operating said pawls, of a series of corresponding swinging fingers mounted on the register shaft and normally sustaining the pawls out of engagement with the corresponding register disks, projections on the fingers for locking the pawls to the register disks during the transfer, and means controlled by the disks of lower order for disengaging the fingers from said pawls, substantially as set forth.

19. In a total adding register, the combination with a series of carrying-pawls, and means for operating said pawls, of a series of corresponding swinging fingers mounted on the register shaft and normally sustaining the pawls out of engagement with the corresponding register disks, projections on the fingers for locking the pawls to the register disks during the transfer, means controlled by the disks of lower order for disengaging the fingers from said pawls, and means for resetting said pawls to again engage the fingers therewith, substantially as set forth.

20. In a total adding register, the combination with a series of register disks, a series of carrying-pawls, a cam shaft, and cams on said shaft for operating said pawls, of a series of corresponding swinging fingers mounted on the register shaft and normally sustaining the pawls out of engagement with the corresponding register disks, projections on the fingers for locking the pawls to the register disks during the transfer, and means controlled by the disks of lower order for disengaging the fingers from said pawls, substantially as set forth.

21. In a total adding register, the combination with a series of register disks, a series of carrying-pawls, a cam shaft, and cams on said shaft for operating said pawls, of a series of corresponding swinging fingers normally sustaining the pawls out of engagement with the corresponding register disks, projections on the fingers for locking the pawls to the register during the transfer, means controlled by the disks of lower order for disengaging the fingers from said pawls, and cams on said cam shaft for resetting the pawls, substantially as set forth.

22. In a total adding register, the combination with a series of register disks, a series of carrying-pawls, and means for operating said pawls, of a series of corresponding swinging fingers normally sustaining the pawls out of engagement with the corresponding register disks, projections on the fingers for locking the pawls to the register during the transfer, and tripping fingers operated by the disks of lower order for disengaging the swinging fingers from said pawls, substantially as set forth.

23. In a cash register, the combination with a series of keys and a money receptacle, of a total adding register comprising a series of register disks, a series of carrying-pawls, means operated by a movable part of the money receptacle subsequent to the depression of a key for operating said carrying-pawls, a series of corresponding swinging fingers mounted on the register shaft and normally sustaining the pawls out of engagement with the corresponding register disks, and means controlled by the disks, projections on the fingers for locking the pawls to the register during the transfer of lower order for disengaging the fingers from said pawls, substantially as set forth.

24. In a cash register, the combination with a series of keys, a stationary money receptacle, and a movable cover therefor, of a total adding register comprising a series of register disks, a series of carrying-pawls, connections between the movable cover and said carrying-pawls, a series of corresponding swinging fingers mounted on the register shaft and normally sustaining the pawls out of engagement with the corresponding register disks, projections on the fingers for locking the pawls to the register during the transfer and means controlled by the disks of lower order for disengaging the fingers from said pawls, substantially as set forth.

25. In a cash register or analogous device, the combination with a series of keys and a primary actuator, of a total adding register comprising a series of register disks, a series of carrying-pawls, a cam shaft, cams on said shaft for operating said carrying-pawls, a series of corresponding swinging fingers normally sustaining the pawls out of engagement with the corresponding register disks, means controlled by the disks of lower order for disengaging the fingers from said pawls, and connections between said cam shaft and the primary actuator for operating the former upon the return movement of the actuator, substantially as set forth.

26. In a cash register or analogous device, the combination with a series of keys, and a primary actuator, of a total adding register comprising a series of register disks, a series of carrying-pawls, a cam shaft, cams on said shaft for operating said carrying-pawls, a series of corresponding swinging fingers normally sustaining the pawls out of engagement with the corresponding register disks, means controlled by the disks of lower order for disengaging the fingers from said pawls, connections between said cam shaft and the primary actuator for operating the former upon the return movement of the actuator, and cams on said cam shaft for resetting the pawls, substantially as set forth.

27. In a cash register, the combination with a series of keys arranged in banks, and a register operating device corresponding to each bank, of a series of total adding register disks, connections between said disks and the register operating devices for moving said disks, a series of carrying-pawls, means for operating said pawls, a series of corresponding swinging fingers normally sustaining the pawls out of engagement with the corresponding register disks, projections on the fingers for locking the pawls to the register disks during the transfer and means controlled by the disks of lower order for disengaging the fingers from said pawls, substantially as set forth.

28. In a cash register, the combination with a series of keys arranged in banks, a series of tablet-rods, a lifting frame, for each bank, and connections between the tablet-rods and the lifting frames, of a series of total adding register disks, connections between said disks and said lifting frames, a series of carrying-pawls, means for operating said pawls, a series of corresponding swinging fingers mounted on the register shaft and normally sustaining the pawls out of engagement with the corresponding register disks, and means controlled by the disks of lower order for disengaging the fingers from said pawls, substantially as set forth.

29. In a cash register, the combination with a series of keys arranged in banks, a primary actuator, and a register operating device corresponding to each bank, of a series of total adding register disks, connections between the primary actuator and the register operating devices, connections between said devices and the register disks, a series of carrying-pawls, means for operating said pawls, a series of corresponding swinging fingers mounted on the register shaft and normally sustaining the pawls out of engagement with the corresponding register disks, projections on the fingers for locking the pawls to the register disks during the transfer and means controlled by the disks of lower order for disengaging the fingers from said pawls, substantially as set forth.

30. In a cash register, the combination with a series of keys arranged in a series of banks, a primary actuator, a series of tablet-rods, connections between the tablet-rods and the primary actuator, a series of lifting frames one corresponding to each bank, and connections between the tablet-rods and said lifting frames, of a series of total adding register disks, connections between the lifting frames and said disks, a series of carrying-pawls, means for operating said pawls, a series of corresponding swinging fingers mounted on the register shaft and normally sustaining the pawls out of engagement with the corresponding register disks, and means controlled by the disks of lower order for disengaging the fingers from said pawls, substantially as set forth.

31. In a cash register, the combination with a series of keys arranged in banks, a primary actuator, and a register operating device corresponding to each bank, of a series of total adding register disks, a series of carrying-pawls, a cam shaft, cams on said shaft for operating said carrying-pawls, a series of corresponding swinging fingers mounted on the register shaft and normally sustaining the pawls out of engagement with the corresponding register disks, means controlled by the disks of lower order for disengaging the fingers from said pawls, and connections between the primary actuator and said cam shaft, substantially as set forth.

32. In a cash register, the combination with a series of keys arranged in banks, a primary actuator, and a register operating device corresponding to each bank, of a series of total adding register disks, a series of carrying-pawls, a cam shaft, cams on said shaft for operating said carrying-pawls, a series of corresponding swinging fingers mounted on the register shaft and normally sustaining the pawls out of engagement with the corresponding register disks, means controlled by the disks of lower order for disengaging the fingers from said pawls, and connections between the primary actuator and said cam shaft, said connections being inoperative on the positive stroke of the primary actuator, substantially as set forth.

33. In a cash register, the combination with a series of keys arranged in banks, a primary actuator, and a register operating device corresponding to each bank, of a series of total adding register disks, a series of carrying-pawls, a cam-shaft, cams on said shaft for operating said carrying-pawls, a series of corresponding swinging fingers mounted on the register shaft and normally sustaining the pawls out of engagement with the corresponding register disks, tripping fingers on the disks of lower order for disengaging the swinging fingers from said pawls, and connections between the primary actuator and said cam shaft, substantially as set forth.

34. In a cash register the combination with register operating devices, of a series of register disks, transfer pawls formed with fingers, and trip-arms or fingers for the pawls having projections which engage the pawl fingers when the latter are tripped to hold said pawls to engagement with the register disks.

35. In a total adding register, the combination with a series of register disks, and a series of carrying-pawls, of a cam shaft, cams on said shaft for operating said carrying-pawls, a segment for rotating said cam shaft, means for normally locking the cam shaft against rotation, and connections between said segment and said locking device for releasing the cam shaft, substantially as set forth.

36. In a total adding register, the combination with a series of register disks and a series of carrying-pawls, of a cam shaft, cams on said shaft for operating said pawls, a pinion on said shaft, a ratchet connection between said pinion and the shaft, a lock for normally locking the shaft, a segment for operating said pinion, and abutting stops on the segment and lock for releasing the latter from the cam shaft, substantially as set forth.

37. In a cash register the combination with a registering mechanism, of an operating bar for the same, a stationary till, a cover for said till, a latch for said cover actuated by the operating bar at the end of its positive stroke, a cash drawer and means carried by the bar and coöperating with the drawer to prevent the opening of the latter until the bar has completed its positive stroke.

38. In a cash register the combination of a series of keys divided into banks, of a series of stops arranged to prevent the operation of more than one key in a bank at the same time, and to lock the keys in their depressed positions, means for disengaging the stops from the keys upon the regular operation of the machine and means for disengaging said stops independent of the regular operation of the machine.

39. In a total adding cash register, the combination with a series of keys and a device released thereby, of a total adding register, mechanism for resetting the same to zero, and connections between said device and the resetting mechanism, substantially as set forth.

40. In a total adding cash register, the

40. In a total adding cash register, the combination with a series of keys and a device released thereby, of a total adding register, mechanism for resetting the same to zero, and normally inactive connections between said device and the resetting mechanism, substantially as set forth.

41. In a total adding cash register, the combination with a series of keys and a device released thereby, of a total adding register, mechanism for resetting the same to zero, and a clutch between said device and the resetting mechanism, substantially as set forth.

42. In a total adding cash register, the combination with a series of keys and a device released thereby, of a total adding register, mechanism for resetting the same to zero, a clutch between said device and the resetting mechanism, and a lock, the bolt of which connects with said clutch, substantially as set forth.

43. In a total adding cash register, the combination with a series of keys and a device released thereby, of a total adding register, mechanism for resetting the same to zero, a clutch between said device and the resetting mechanism, a lock the bolt of which connects with said clutch, and a register coöperating with said lock, substantially as set forth.

44. In a total adding cash register, the combination with a series of keys, and a primary actuator therefor released by the keys, of a total adding register, mechanism for resetting the same to zero, and connections between the primary actuator and the resetting mechanism, substantially as set forth.

45. In a total adding cash register, the combination with a series of keys, and a primary actuator released by the keys, of a total adding register, mechanism for resetting the same to zero, and a clutch between the primary actuator and the resetting mechanism, substantially as set forth.

46. In a total adding cash register, the combination with a series of keys, and a primary actuator released by the keys, of a total adding register, mechanism for resetting the same to zero, a clutch between the primary actuator and the resetting mechanism, and a lock, the bolt of which connects with said clutch, substantially as set forth.

47. In a total adding cash register, the combination with a series of keys and a device released thereby, of a resetting shaft, a series of total adding register disks mounted on said resetting shaft, connections between the resetting shaft and said disks for resetting the latter, and connections between said device and the resetting shaft, substantially as set forth.

48. In a total adding cash register, the combination with a series of keys and a device released thereby, of a resetting shaft, a series of total adding register disks mounted on said resetting shaft, connections between the resetting shaft and said disks for resetting the latter, and a clutch between said device and the resetting shaft, substantially as set forth.

49. In a total adding cash register, the combination with a series of keys and a device released thereby, of a resetting shaft, a series of total adding register disks mounted on said resetting shaft, connections between the resetting shaft and said disks for resetting the latter, a clutch between said device and the resetting shaft, and a lock, the bolt of which connects with said clutch, substantially as set forth.

50. In a total adding cash register, the combination with a series of keys, of a resetting shaft, a series of total adding register disks mounted on said shaft, an operating device for the shaft, a clutch between the operating device and shaft, a lock the bolt of which connects with said clutch, and means controlled by said lock for locking the shaft normally against rotation, substantially as set forth.

51. In a total adding cash register, the combination with a series of keys and a device released thereby, of a resetting shaft, a series of total adding register disks mounted on said shaft, a clutch between said device and shaft, a lock the bolt of which connects with said clutch, and means controlled by said lock for locking the shaft normally against rotation, substantially as set forth.

52. In a total adding cash register, the combination with a series of keys and a device released thereby, of a total adding register, a special counter, mechanism for simultaneously resetting the register and counter to zero, and connections between said device and the resetting mechanism, substantially as set forth.

53. In a total adding cash register, the combination with a series of keys and a device released thereby, of a total adding register, a special counter, mechanism for simultaneously resetting the register and counter to zero, and a clutch between said device and the resetting mechanism, substantially as set forth.

54. In a total adding cash register, the combination with a series of keys and a device released thereby, of a total adding register, a special counter, mechanism for simultaneouly resetting the register and counter to zero, a clutch between said device and the resetting mechanism, and a lock, the bolt of which connects with said clutch, substantially as set forth.

55. In a total adding cash register, the combination with a series of keys and a device released thereby, of a total adding register, a special counter, mechanism for simultaneously resetting the register and counter to zero, a clutch between said device and the resetting mechanism, a lock the bolt of which connects with said clutch, and a register operated by said lock, substantially as set forth.

56. In a total adding cash register, the combination with a series of keys and a device released thereby, of a resetting shaft, a total adding register mounted on said shaft, a special counter also mounted on said shaft, and connections between said device and the resetting shaft, substantially as set forth.

57. In a total adding cash register, the combination with a series of keys and a device released thereby, of a resetting shaft, a total adding register mounted on said shaft, a special counter also mounted on said shaft, and a clutch between said device and the resetting shaft, substantially as set forth.

58. In a total adding cash register, the combination with a series of keys and a device released thereby, of a resetting shaft, a total adding register mounted on said shaft, a special counter also mounted on said shaft, a clutch between said device and the resetting shaft, and a lock, the bolt of which connects with said clutch, substantially as set forth.

59. In a total adding cash register, the combination with a series of keys, and a primary actuator released by the keys, of a total adding register and a special counter, mechanism for simultaneously resetting to zero the register and counter, and connections between the primary actuator and the resetting mechanism, substantially as set forth.

60. In a total adding cash register, the combination with a series of keys, and a primary actuator released by the keys, of a resetting shaft, a total adding register carried on said shaft, a special counter also carried on said shaft, and connections between said shaft and the primary actuator, substantially as set forth.

61. In a total adding cash register, the combination with a series of keys, and a primary actuator released by the keys, of a resetting shaft, a total adding register carried on said shaft, a special counter also carried on said shaft, and a clutch between said shaft and primary actuator, substantially as set forth.

62. In a total adding cash register, the combination with a series of keys, and a primary actuator released by the keys, of a resetting shaft, a total adding register carried on said shaft, a special counter also carried on said shaft, a clutch between said shaft and primary actuator, and a lock the bolt of which connects with said clutch, substantially as set forth.

63. In a cash register, the combination with a series of keys representing sales and no sales, of a counter for registering sales, a counter for registering no sales, connections controlled by all the sales keys for independently operating said sales counter, connections controlled by said no-sales key for operating said no-sales counter, and interconnecting mechanism between said operating connections whereby said sales counter is thrown out of operative connection when said no-sales key is used, substantially as set forth.

64. In a cash register, the combination with a series of sale keys and a no-sale key, of a relatively stationary counter for registering sales, an operating pawl therefor, means controlled by all of the keys for operating said pawl, a relatively stationary counter for registering no sales, an operating pawl therefor, means controlled by the no-sale key for operating the last mentioned pawl, and connections between the two pawls for disengaging the sales pawl from its counter when the no-sale pawl is operated, substantially as set forth.

65. In a cash register, the combination with a series of sale keys and including a no-sale key, a series of tablet-bars, and a tablet-elevating bar for all the tablets, of a counter for registering sales, a counter for registering no sales, connections between the tablet-elevating bar and the sales counter for operating the latter, connections between the no-sale tablet-rod and the no-sale counter for operating the latter, and connections between the no-sale counter and the sales counter for preventing the operation of the latter when the no-sale counter is operated, substantially as set forth.

66. In a cash register, the combination with a series of sale keys and including a no-sale key, a series of tablet-rods, and a tablet-elevating bar, of a counter for registering sales, a pawl for operating said counter, a counter for registering no sales, a pawl for operating said counter, connections between the tablet-elevating bar and the sales pawl, connections between the no-sale tablet-rod and the no-sale pawl, and connections between the two pawls, substantially as set forth.

67. In a cash register, the combination with a series of sale keys and including a no-sale key, a series of tablet-rods, and a tablet-elevating bar, of a counter for registering sales, a pawl for operating said counter, a counter for registering no sales, a pawl for operating said counter, connections between the tablet-elevating bar and the sales pawl, connections between the no-sale tablet-rod and the no-sale pawl, connections between the two pawls, and connections between the no-sale tablet-rod and the no-sale pawl for operating the latter before the operation of the sales pawl by the tablet-elevating bar, substantially as set forth.

68. In a cash register, the combination of a series of keys, a series of tablet-rods a stationary till, a movable cover therefor, a bar for operating the same, connections between said bar and the tablet-rods, a rockbar, a series of locking fingers on said rockbar for engaging the elevated tablets, and means controlled by the preliminary movement of the operating-bar for rocking said rock-bar to allow any exposed tablet to drop, substantially as set forth.

69. In a cash register, the combination of a series of keys, a series of tablet-rods, a stationary till, a movable cover therefor, a bar for operating the same, connections between said bar and the tablet-rods, a rockbar, a series of locking fingers on said rockbar for engaging the elevated tablets, an arm carried by the rock-bar, a spring-pawl on said arm, and a lock carried by the operating bar for engaging said pawl, substantially as set forth.

70. In a cash register, the combination with a series of keys, a stationary till, and a movable cover, of a lock for said cover, and an operating-bar released by the keys for engaging said lock near the completion of its movement, substantially as set forth.

71. In a cash register, the combination with a series of keys, a stationary till, and a movable cover, of a lock for said cover, an operating-bar released by the keys for engaging said lock near the completion of its movement, and connections between said cover and said bar for closing the cover by the return movement of the bar, substantially as set forth.

72. In a cash register, the combination with a series of keys, a stationary till, and a movable cover, of a lock for said cover, an operating-bar released by the keys for engaging said lock near the completion of its movement, and a slotted link connecting said bar with the cover for closing the cover upon the return movement of the bar, substantially as set forth.

73. In a cash register, the combination with a series of keys, a stationary till, a pivoted cover therefor, and an operating-bar mounted on the same pivot with the cover, of a lock for maintaining the cover in a normally closed position, and connections between said bar and lock for disengaging the cover near the completion of the movement of said bar, substantially as set forth.

74. In a cash register, the combination with a series of keys, a stationary till, a pivoted cover therefor, and an operating-bar mounted on the same pivot with the cover, of a lock for maintaining the cover in a normally closed position, connections between said bar and lock for disengaging the cover near the completion of the movement of said bar, and connections between the bar and the cover for closing the latter upon the return movement of said bar, substantially as set forth.

75. In a cash register, the combination with a series of keys, a stationary till, a pivoted cover therefor, and an operating-bar mounted on the same pivot with the cover, of a lock for maintaining the cover in a normally closed position, connections between said bar and lock for disengaging the cover near the completion of the movement of said bar, and a slotted link between said bar and cover for closing the cover upon the return movement of the bar, substantially as set forth.

76. In a cash register the combination of a series of keys divided into banks, a series of corresponding key stops arranged to prevent the operation of more than one key at a time in each bank, projections on the stops for locking the keys in their depressed positions, and means for rocking the key stops out of the paths of the keys to release the depressed keys.

77. In a cash register, the combination with a tablet bar therefor made of two sections telescoping together, the upper section carrying the tablet, and a pivoted foot on the lower section, of means for elevating said tablet bar normally disconnected from but arranged to engage with said foot, substantially as set forth.

78. In a cash register, the combination with a tablet bar therefor made in two sections telescoping together, a locking tooth on the upper section for maintaining it in an elevated position, and a pivoted foot on the lower section, of means for elevating said tablet bar normally disconnected from but arranged to engage with said foot, substantially as set forth.

79. In a cash register the combination with a series of tablet bars each comprising two sections telescoping together, the upper section carrying the tablet, a tablet elevating member common to all of the tablets, a pivoted foot on the lower section of each tablet bar and normally out of the path of the elevating member, but adapted to be moved into the path of the same.

80. In a cash register, the combination of a series of keys, a series of corresponding swinging pivoted key stops, adapted to prevent the operation of more than one key at a time in each bank and a head on each stop beneath which the key normally rests, but in front of which it is adapted to be moved so as to be locked in a depressed position, substantially as set forth.

81. In a cash register, the combination of a series of keys, a series of corresponding key stops, adapted to prevent the operation of more than one key at a time in each bank, a head on each stop beneath which the key normally rests but in front of which it is adapted to be moved so as to be locked in a depressed position, and a finger-piece for disengaging said key stop from a locked key, substantially as set forth.

82. In a cash register, the combination of a series of keys, a money receptacle, a rock-bar mounted above said keys, a series of swinging pivoted key stops pivoted to said bar and with which the keys are adapted to be engaged to lock the keys in a depressed position, and means operating subsequent to the disclosure of the money receptacle for rocking said bar to release a depressed key, substantially as set forth.

83. In a cash register, the combination of a series of keys, a money receptacle, a rock-bar mounted above said keys, a series of key-stops pivoted to said bar and with which the keys are adapted to be engaged to lock the keys in a depressed position, means operating subsequent to the disclosure of the money receptacle for rocking said bar to release a depressed key, and a finger-piece connected to said rock-bar for operating the same when a wrong key has been actuated, substantially as set forth.

84. In a cash register, the combination with a series of keys, a series of tablets, and a tablet elevating bar, of a register having a series of disks, a pawl for each disk for preventing return movement thereof, means for operating the register disks, an overthrow brake adapted to engage simultaneously all of said pawls, and connections between the overthrow brake and the tablet elevating bar, substantially as set forth.

85. In a cash register, the combination with a series of keys, a series of tablets, and a tablet-elevating-bar, of a register, means for operating said register, an overthrow-brake for the register, and elastic or buffer connections between the overthrow-brake and the tablet-elevating bar, substantially as set forth.

86. In a cash registering machine, a registering mechanism, an indicating mechanism, an actuating mechanism for the registering and indicating mechanisms, a resetting mechanism independent of the regular actuating mechanism for resetting the registering mechanism to zero, and means for connecting said actuating mechanism with said resetting mechanism, substantially as set forth.

87. In a cash register the combination with a stationary till, of a movable cover for the same, a latch for said cover, a movable bar for tripping said latch to allow the cover to open independently of further movement of the bar, and means connecting the bar to the cover for closing the latter upon the return movement of the former.

88. In a cash register the combination with a stationary till, of a movable cover for the same, a latch for said cover, a spring for opening said cover when released, a movable bar for releasing said cover on movement in one direction and returning the cover to normal latched position upon movement in the opposite direction.

89. In a cash register the combination with a register, of a register operating mechanism, turn-to-zero devices for the register, a rack segment permanently coupled to the operating mechanism, a pinion meshing with the segment, and a clutch means between the turn-to-zero devices and the pinion whereby a single rotation of the pinion will turn the register to zero.

90. In a cash register the combination with a register, of a register operating mechanism, turn-to-zero devices for the register, means for coupling the turn to zero devices to the operating mechanism whereby a single regular operation of the latter will return the register to zero, and a special register adapted to add one each time the above coupling is effected.

91. In a cash register, the combination with a series of keys arranged in a plurality of banks, a register operating device corresponding to each bank, and a total adding register having a series of register disks, of a series of printing devices connected with the register operating devices, a swinging printing-frame coöperating therewith, means for operating said printing-frame subsequent to the depression of a key, and an inking frame carrying an inking roller, and means connecting the inking frame and the printing frame so that they move together, substantially as set forth.

92. In a cash register, the combination with a series of keys arranged in a plurality of banks, a register operating device corresponding to each bank, and a total adding register having a series of register disks, of a series of printing devices connected with the register operating devices, a swinging printing-frame coöperating therewith and carrying a web of paper, means for operating said printing-frame subsequent to the depression of a key, an inking-frame carrying an inking roller and connections between the printing-frame and inking frame so that they move together, substantially as set forth.

93. In a cash register, the combination with a series of keys arranged in a plurality of banks, a register operating device corresponding to each bank, and a total adding register having a series of register disks, of a series of printing-devices connected with the register operating devices, a swinging printing-frame coöperating therewith, means for operating said printing-frame subsequent to the depression of a key, an inking-frame, connections between the printing-frame and inking-frame, an inking roller carried by the inking-frame, and an ink roll above the same with which the inking roller engages during the printing operation, substantially as set forth.

94. In a cash register, the combination with a normally inaccessible cash receptacle, of an oscillatory operating mechanism, means actuated by said mechanism near the end of the stroke in one direction to render the cash receptacle accessible, and means positively actuated by the operating mechanism while moving in the opposite direction to reëstablish the normally inaccessible condition of the receptacle.

95. In a cash register, the combination of a stationary till, a movable cover and operating mechanism therefor, a money drawer and coöperating interlocking rims controlled by the operating mechanism and drawer for preventing the operation of the cover while the drawer is in open position, substantially as set forth.

96. In a cash register, the combination of a stationary till, a movable till-cover, a lock for said till-cover, a swinging segment for tripping said lock, a movable money drawer located beneath the till, and a rim on the segment coöperating with a notch carried by the money drawer, substantially as set forth.

97. In a cash register, the combination of a stationary till, a movable till-cover, a lock for said till-cover, a swinging segment for tripping said lock, a movable money drawer located beneath the till, a rim on the segment coöperating with a notch carried by the money drawer, said rim having a notch therein, and a track carried by the money drawer and coöperating with the last mentioned notch to permit the opening of the money drawer when the segment has been moved to its complete positive stroke, substantially as set forth.

98. In a cash register, the combination of a money drawer therefor, a track located beneath said money drawer, a plate carried by the money drawer and formed with rearward projections, a roller mounted on a horizontal shaft carried by said projections, and fingers carried by said projections and engaging the sides of said track, substantially as set forth.

99. In a total adding register, the combination of a series of registering disks, a series of carrying pawls, a cam shaft, cams on said shaft operating said carrying pawls, means for rotating said cam shaft, and a latch normally locking the cam shaft against rotation in either direction and coöperating with the rotating means for the cam shaft for automatically releasing the cam shaft, substantially as set forth.

100. In a cash register, a series of register disks, a series of carrying-pawls, movable supports for said pawls, means for operating said pawls, a series of corresponding sustaining fingers mounted independently of the pawl supports and normally holding the pawls out of engagement with the corresponding registering disks throughout their movement, and means connected with the disks of lower order for disengaging the fingers from said pawls, substantially as set forth.

101. In a cash register, a series of registering disks, actuating mechanism therefor, registering amounts thereon, mechanism for resetting the disks to zero, and normally inactive connections between said actuating mechanism and said resetting mechanism.

102. In a cash register, a series of registering disks, actuating mechanism therefor, mechanism for resetting the disks to zero, and a clutch between the actuating mechanism and the resetting mechanism, substantially as set forth.

103. In a cash register, a series of total adding registering disks, actuating mechanism therefor which moves the registering disks varying distances upon its positive movement and actuates a carrying mechanism upon its negative stroke, resetting mechanism for the registering disks, connections between the actuating mechanism and the resetting mechanism whereby the registering disks are reset to zero partially on the positive stroke of the actuating mechanism and partially upon the negative stroke of said mechanism, substantially as set forth.

104. In a cash register, a series of registering disks registering amounts of sales, a counter for registering no sales, a series of actuators for actuating the registering disks and the no-sale counter, and a counter for registering the number of sales arranged to be actuated by any of the said actuators, a mechanism for preventing registration upon the number of sales registering counter when the no-sale counter is actuated.

105. In a cash register, a counter for registering no sales, a sales registering counter, actuators therefor and connections between the actuators whereby the actuator for the sales registering counter is rendered inoperative when the no sale counter is operated.

106. In a cash register, the combination of a series of keys, a rocking bar mounted above said keys, a series of key stops pivoted upon the bar and extending substantially parallel with the keys, and latch heads carried by said stops by which the keys may be locked in a depressed position, substantially as set forth.

107. In a cash register, the combination of a series of keys, a rocking bar mounted above said keys, a series of key stops pivoted upon the bar and extending substantially parallel with the keys, latch heads carried by said stops by which the keys may be locked in a depressed position, and means for rocking said bar to elevate all of the key stops to release a depressed key, substantially as set forth.

108. In a cash registering machine, a registering mechanism, an indicating mechanism, an actuating mechanism for said registering mechanism and said indicating mechanism, a resetting mechanism for the registering mechanism, and normally inactive connections between said actuating mechanism and said resetting mechanism, substantially as set forth.

109. In a cash register, the combination with a register operating mechanism, of a register, turn to zero devices for the register, means for coupling the turn to zero devices to the operating mechanism and a counter arranged to count the number of times that this coupling is effected.

110. The combination with a register, a register operating mechanism, turn to zero devices for the register, means for coupling the turn to zero devices to the operating mechanism and a lock controlling this coupling means.

111. The combination with a register operating mechanism, of a register, turn to zero devices for the register, means for coupling the turn to zero devices to the operating mechanism, a lock controlling the coupling means and a register operated by the lock.

112. The combination with a register operating mechanism, of a register including a shaft and a number of registering wheels and means for coupling the shaft to the operating mechanism to turn the wheels to their zero positions.

113. The combination with a register operating mechanism, of a register including a shaft and numbered wheels mounted thereon and manually operated devices for coupling the shaft to the operating mechanism at will.

114. The combination with a register operating mechanism, of a register, turn to zero devices for the register, means for coupling the turn to zero devices to the operating mechanism, a lock for controlling the coupling means and a counter actuated by the lock to count one at each operation thereof.

115. In a cash register, the combination with a series of pivoted keys, of a series of pivoted key stops and means for moving the stops to disengage them from the keys.

116. In a cash register the combination with a series of keys, of a series of pivoted key stops and means for moving said stops to disengage them from the keys.

117. In a cash register, the combination with a series of keys, of a series of pivoted key stops which act as detents for the keys and means for moving said stops to disengage them from the keys.

118. In a cash register, the combination with a series of keys having locking projections, of a series of pivoted key stops having key locking projections and means supporting said stops and so arranged as to permit movement thereof at right angles to their regular pivotal movement.

119. In a cash register, the combination with a registering mechanism, of an operating member for the same, a cash drawer, and means carried by the operating member and normally engaging the cash drawer to prevent the opening of the said drawer except at one point in the movement of said member.

120. In a cash register, the combination with an operating mechanism, of an operating member for the same, a cash drawer and means carried by the operating member and directly obstructed by the cash drawer to prevent operation of said member when the drawer is open.

121. In a cash register, the combination of a series of keys, of a series of pivoted stops arranged to also act as detents for the keys, means for disengaging the stops from the keys upon the regular operation of the machine and means for disengaging said stops from the keys independently of the operation of the machine.

122. In a cash register, the combination with an operating member and a cash drawer and interlocking means between the drawer and member whereby said member is locked when the cash drawer is in certain positions and said cash drawer is locked when said member is in certain positions.

123. In a cash register, the combination with a series of keys, of a movable member, a series of pivoted key stops mounted on said movable member and constructed to hold the keys in their operated positions, and means for actuating said movable member to disengage the stops from the keys.

124. In a cash register, the combination with a series of keys, of a rocking member, a series of pivoted key stops mounted on said member and constructed to hold the keys in their operated positions, and means for rocking said member to disengage the stops from the keys.

125. In a cash register, the combination with a series of keys, a counter operating frame, a counter, devices set by the keys for operating the frame, a common actuator, and means connected to the common actuator for positively returning the frame to its normal position.

126. In a cash register, the combination with a series of keys, of an operating frame controlled thereby, a counter, an operating mechanism, and means intermediate the operating mechanism and the frame for returning the latter to its normal position but allowing free independent movement of the same.

127. In a cash register, the combination with a series of keys, of a counter operating frame, graduated means intermediate the keys and the frame arranged to be set by the keys, a common actuator for said graduated means, a counter, and devices intermediate the common actuator and said frame for returning the latter to its normal position.

128. In a cash register, the combination with a series of keys, of a counter operating frame, a counter, a series of operating devices arranged to be set by the keys, an actuator for elevating said operating devices, and a link connection between the counter operating frame and said actuator whereby the frame is positively returned to its normal position.

129. In a cash register, the combination with a registering mechanism, of an operating device for the same, a cash drawer, and means moving with the operating device and forming an obstruction against the opening or closing of the drawer during a certain portion of the movement of said device.

130. In a cash register, the combination with a registering mechanism and an operating device therefor, of a cash drawer, and a flange carried by the operating device and forming an obstruction against the movement of the drawer during a certain portion of the movement of said device.

131. In a cash register, the combination with a stationary till, of a movable cover for the same, an operating mechanism, a latch for the movable cover connected to the operating mechanism, and means intermediate the operating mechanism and the movable cover for returning said cover to its closed position by the operation of said mechanism.

132. In a cash register, the combination with a series of keys, of a series of stops, and means for simultaneously changing the relative positions of all the keys and the key stops to disengage the same.

133. In a cash register, the combination with an operating mechanism, of turn-to-zero devices for the counter arranged to return the "units" wheel to zero and the remaining wheels to the "9" position, means for connecting the turn-to-zero devices to the operating mechanism, and transfer devices also connected to the operating mechanism so that they will turn the wheels which are returned to the "9" position, to the zero position subsequent to the movement of the units wheel to zero.

134. In a cash register, the combination with a series of typecarriers and manipulative means controlling the position of the same, of a platen frame; a paper feeding device carried by the platen frame; an ink roller frame carrying an ink roller for inking the typecarriers; and an arm connecting said platen frame and said ink roller frame to carry the ink roller away from printing line when the platen frame is operated to take the impression.

135. In a cash register, the combination with a series of typecarriers and manipulative means controlling the position of the same, of a platen frame; means for supporting and feeding a paper strip carried by the platen frame; an ink roller frame carrying an ink roller for inking the typecarriers; an arm connecting said platen frame and said ink roller frame to carry the ink roller away from printing line when the platen frame is operated to take the impression; and a stationary ink supply roll positioned to be struck by the movable ink roller when the latter is moved away from printing line by the platen frame.

136. In a cash register, the combination with a series of typecarriers and manipulative means for controlling the same, of a pivoted platen frame carrying a platen roller over which the paper may be led; means carried by the platen frame for feeding the paper; a pivoted ink roller frame carrying an ink roller normally resting in proximity to the printing line of the type; means for operating the platen frame for carrying the platen against the type; and an arm connecting the platen frame with the ink roller frame to operate the latter to carry the ink roller past the printing line to ink the type upon the movement of the platen frame.

137. In a cash register, the combination with a main operating mechanism, of a stationary till, a movable cover for the same, a movable till adapted to be exposed, and means intermediate the main operating mechanism and the movable till for preventing the exposure of said movable till until the main operating mechanism has completed its positive stroke.

138. In a cash register, the combination with a main operating mechanism, of a stationary till, a movable cover for the same, a movable till adapted to be exposed, and means intermediate the main operating mechanism and the movable till for preventing the return of the main operating mechanism to normal position while the movable till is in exposed position.

139. In a cash register, the combination with a series of manipulative devices, of combined arresters and detents for same, and means for moving said combined arresters and detents to release an operated manipulative device.

140. In a cash register, the combination with a series of pivoted manipulative devices, of combined arresters and detents for same, and devices for moving said arresters and detents to release a positioned manipulative device.

141. In a cash register, the combination with a series of keys, of devices for preventing depression of more than one key and retaining said key depressed, and manipulative means for moving said devices to release a positioned key.

142. In a cash register, the combination with a series of registering elements, of transfer devices for same, an operating mechanism, means for partially resetting the registering elements by actuation of the operating mechanism, and for thereupon actuating the transfer devices to complete the resetting of the registering elements.

143. In a cash register, the combination with a series of registering elements, of transfer devices for same, mechanism for partially resetting the registering elements and thereby adjusting the transfer devices, and means for completely resetting the registering mechanism by the operation of said transfer devices.

144. In a cash register, the combination with a register, of means for actuating same operated at each operation of the cash register, a second register, means for actuating said second register actuated by the cash register when desired, and connections from said first to said second actuating means for preventing an effective stroke of said first means when said second means is actuated, by withdrawing said first means from operative position.

145. In a cash register, the combination with a register, and actuating devices therefor given a constant excursion by the cash register at each operation thereof, a second register and actuating devices therefor given an excursion by the cash register when desired, and connections controlled by the actuating devices for said second register for destroying the operative control of the actuating devices of the first register.

146. In a cash register, the combination with a cash safe having a movable part, of a latch for said movable part, a spring for positioning the movable part when the latch therefor is tripped so as to render the cash safe accessible, and an operating mechanism for tripping the latch and afterward restoring the movable part of the cash safe to normal position to render the said cash safe inaccessible.

147. In a cash register, the combination with an operating mechanism, of a lock therefor, a series of keys any one of which may operate said lock, a cash safe having a movable part, a latch for the movable part, a spring for positioning the movable part when the latch is tripped so as to render the cash safe accessible, and devices connected to the operating mechanism for tripping the latch and afterward restoring the movable part to normal position so as to render the cash safe inaccessible.

148. In a cash register, the combination with an operating mechanism, of a normally concealed indicator composed of two parts, and a manipulative device for connecting one of the parts of said indicator to the operating mechanism so that upon the operation of the latter the other part of the indicator will be exposed.

149. In a cash register, the combination with an operating mechanism, of a normally concealed indicator composed of two parts, one of said parts carrying a pivoted device, and a manipulative device for adjusting the pivoted device so that upon the actuation of the operating mechanism the indicator will be exposed.

150. In a cash register, the combination with a plurality of counters for keeping separate the number of different classes of transactions entered in the cash register, of operating means therefor, and means for determining which counter is to be operated upon the actuation of the operating means.

151. In a cash register, the combination with a plurality of counters for keeping separate the number of different classes of transactions entered in the cash register, of operating means therefor, mechanism normally connecting one of the counters with the operating means, and a manipulative device for disconnecting the normally connected mechanism and connecting another counter with the operating means.

152. In a cash register, the combination with a plurality of counters for keeping separate the number of different classes of transactions entered in the cash register, of operating means therefor, one of said counters being normally connected to the operating means, a manipulative device, mechanism actuated thereby connecting another counter to the operating means, and means controlled by the actuated mechanism for disconnecting the normally connected counter.

153. In a cash register, the combination with sales and no sales counters for keeping separate the number of sales and no sales transactions entered in the cash register, of operating means therefor, the sale counter being normally connected to the operating means, a no sales key, and mechanism controlled thereby for connecting the no sales counter and disconnecting the sales counter and operating mechanism.

154. In a cash register, the combination with a totalizer comprising a plurality of registering wheels of different denominations, of devices for transferring from wheels of lower to higher denominations, cams successively operating said transfer devices, a shaft carrying said cams, means normally locking the shaft, and means for first unlocking the shaft and then rotating the same.

155. In a cash register, the combination with a totalizer comprising a plurality of movable elements of different denominations, of devices for transferring from wheels of lower to higher denominations, a movable mechanism successively operating the transfer devices, means normally rendering said mechanism inoperative, and means for first rendering the mechanism operative and then operating same.

156. In a machine of the class described, the combination with a totalizer comprising a plurality of movable elements, of operating means therefor, resetting means for the elements of the totalizer normally out of operative relation with the operating means, and means for establishing such relation so that the elements of the totalizer may be returned to zero by actuation of the operating means.

157. In a machine of the class described, the combination with a totalizer comprising a plurality of movable elements, of operating means therefor, mechanism normally locking said operating means, manipulative devices operating the locking mechanism, resetting means for the elements of the totalizer normally out of operative relation with the operating means, and means for establishing such relation so that the elements of the totalizer may be returned to zero by actuation of the operating mechanism.

158. In a machine of the class described, the combination with a totalizer comprising a plurality of movable elements, operating means therefor, resetting means for the elements of the totalizer normally out of operative relation with the operating mechanism, means for establishing such relation so that the elements of the totalizer may be returned to zero by actuation of the operating means, and a special counter controlled by the means establishing the operative relation between the resetting means and the operating means.

159. In a machine of the class described, the combination with a totalizer comprising a plurality of movable elements, of manipulative devices determining the extent of movement of the elements of the totalizer, resetting means for the totalizer normally out of operative relation with said totalizer, means for establishing such relation, and a special counter controlled by the means establishing the operative relation between the resetting means and the totalizer.

160. In a cash register, the combination with a series of type-carriers and manipulative devices controlling the positioning of same, of a movable frame and a platen carried thereby for taking an impression on a record strip from the type-carriers, and feeding means for the record strip also carried by the movable frame, the said platen forming a part of the feeding means.

161. In a cash register, the combination with a series of type-carriers and manipulative devices controlling the positioning of same, of a pivoted frame and a platen roller carried thereby for taking an impression on a record strip from the type-carriers, and feeding means for the record strip comprising the platen roller and another roller carried by the movable frame.

162. In a cash register, the combination with a series of type-carriers and manipulative devices controlling the positioning of same, of a pivoted frame and a platen roller carried thereby for taking an impression on a record strip from the type-carriers, an operating mechanism setting the type-carriers and rocking the frame to take an impression therefrom, and feeding means for the record strip comprising the platen roller and another roller carried by the pivoted frame.

163. In an accounting machine, the combination with an operating mechanism, of a series of registering wheels, means under the control of the operating mechanism but normally out of coöperative relation therewith for turning the units wheel to "zero" and the remaining wheels to "nine" position, a manipulative device for bringing the said means and operating mechanism into coöperative relation, and devices under the control of each wheel for carrying the wheel of next higher denomination from "nine" to "zero."

164. In an accounting machine, the combination with an operating mechanism, of a series of registering wheels, means under the control of the operating mechanism but normally out of coöperative relation therewith for turning the units wheel to "zero" and the remaining wheels to "nine" position, a manipulative device for bringing the said means and operating mechanism into coöperative relation, and transfer devices between the wheels of different denominations and tripped by the wheels as they reach zero position for turning the wheels of next higher denominations from "nine" to "zero."

165. In an accounting machine, the combination with an operating mechanism, of a series of registering wheels, keys for determining the amount to be registered upon said wheels by an operation of the operating mechanism, means under the control of the operating mechanism but normally out of coöperative relation therewith for turning the units wheel to "zero" and the remaining wheels to "nine" position, a manipulative device for bringing the said means and operating mechanism into cooperative relation, and transfer devices between the wheels of different denominations and tripped by the wheels as they reach zero position for turning the wheels of next higher denominations from "nine" to "zero."

This specification signed and witnessed this 24th day of Jan. 1899.

FRANCIS C. OSBORN.

Witnesses:
ANNA M. GREGORY,
GEORGE MAITLAND.